United States Patent
Hwang et al.

(10) Patent No.: US 9,178,439 B2
(45) Date of Patent: Nov. 3, 2015

(54) SYSTEM AND METHOD FOR LIMITING OUTPUT CURRENT IN A SWITCHING POWER SUPPLY

(71) Applicant: Champion Microelectronic Corporation, Hsinchu (TW)

(72) Inventors: Jeffrey Hwang, Saratoga, CA (US); Alland Chee, Union City, CA (US)

(73) Assignee: Champion Microelectronics Corporation, Hsinchu (TW)

( * ) Notice: Subject to any disclaimer, the term of this patent is extended or adjusted under 35 U.S.C. 154(b) by 261 days.

(21) Appl. No.: 13/777,102

(22) Filed: Feb. 26, 2013

(65) Prior Publication Data

US 2014/0241018 A1    Aug. 28, 2014

(51) Int. Cl.
*H02M 3/338* (2006.01)
*H02M 3/337* (2006.01)
*H02M 3/335* (2006.01)
*H02M 1/00* (2007.01)

(52) U.S. Cl.
CPC .......... *H02M 3/3376* (2013.01); *H02M 3/3388* (2013.01); *H02M 3/33561* (2013.01); *H02M 2001/007* (2013.01); *H02M 2001/009* (2013.01); *H02M 2001/0019* (2013.01); *H02M 2001/0032* (2013.01); *H02M 2001/0058* (2013.01)

(58) Field of Classification Search
CPC ................. H02M 2001/0009; H02M 3/33507; H02M 3/33523; H02M 3/33561; H02M 3/3388
USPC .................................................. 361/93.7, 93.9
See application file for complete search history.

(56) References Cited

U.S. PATENT DOCUMENTS

| | | | |
|---|---|---|---|
| 7,660,133 B1* | 2/2010 | Hwang et al. | 363/16 |
| 2002/0027786 A1* | 3/2002 | Nakazawa et al. | 363/21.05 |
| 2004/0123164 A1* | 6/2004 | Chapuis et al. | 713/300 |
| 2009/0034298 A1* | 2/2009 | Liu et al. | 363/17 |

* cited by examiner

*Primary Examiner* — Harry Behm
(74) *Attorney, Agent, or Firm* — Westberg Law Offices

(57) ABSTRACT

A switching power supply comprises one or more power supply stages configured to receive power from an input power source and to generate an output voltage for powering a load by alternately opening and closing a set of switches. An output current sensor is configured to monitor a level of an output current of the switching power supply. The opening and closing of the set of switches is controlled so as to maintain the output voltage at a desired level when the level of the output current is below the threshold and so as to limit the output current when the level of the output current exceeds the threshold.

23 Claims, 13 Drawing Sheets

SYSTEM AND METHOD FOR LIMITING OUTPUT CURRENT IN A SWITCHING POWER SUPPLY

FIELD OF THE INVENTION

The present invention relates to the field of power supplies. More particularly, the present invention relates to the field of switching power supplies.

BACKGROUND OF THE INVENTION

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated DC output which can be used to power the load. The rectified output of the PFC stage is typically at higher voltage and is more loosely regulated than the output of the DC-to-DC stage.

Under certain conditions, a load that receives power from the power supply may present abnormally low impedance. If left unchecked, this condition could result in an excessively high level of output current.

It is desired to provide an improved power supply. It is also desired to provide an improved system and method for limiting output current in a switching power supply.

SUMMARY OF THE INVENTION

The present invention is directed toward a switching power supply, to a controller for a switching power supply, and to a method of controlling a switching power supply. In an embodiment, a switching power supply comprises one or more power supply stages configured to receive power from an input power source and to generate an output voltage for powering a load by alternately opening and closing a set of switches. An output current sensor is configured to monitor a level of an output current of the switching power supply. The opening and closing of the set of switches is controlled so as to maintain the output voltage at a desired level when the level of the output current is below the threshold and so as to limit the output current when the level of the output current exceeds the threshold.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

The present invention is directed toward a switching power supply, to a controller for switching power supply and to a method of controlling a switching power supply. The present invention allows a switching power supply to operate in an output voltage control mode under normal conditions and, under abnormal conditions, such as when a load presents an abnormally low impedance, the switching power supply can operate in an output current control mode. This allows the power supply to operate safely and predictably despite abnormal loading conditions. While the present invention is described in the context of an offline power supply that includes a power factor correction stage and a resonant power converter, it will be apparent that other power supply configurations can be employed. For example, the invention can be implemented in a power supply having a forward converter or some other configuration.

Figure 1:
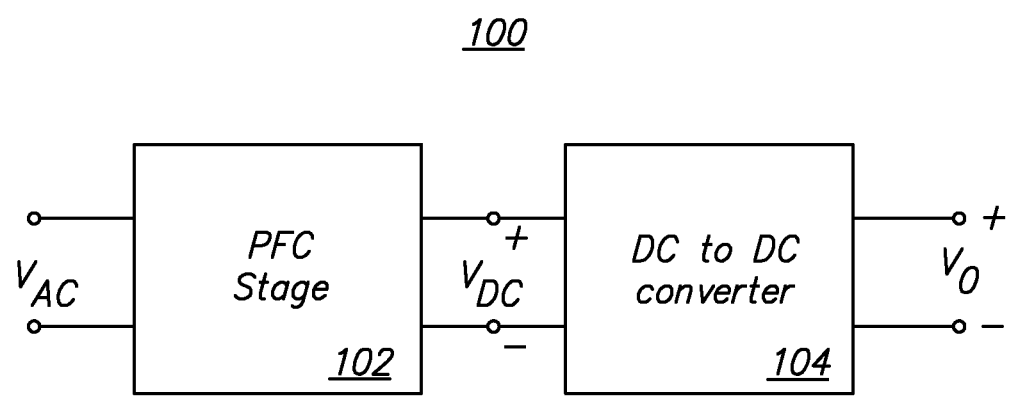
FIG. 1 illustrates a block schematic diagram of a two-stage, off-line switching power supply in accordance with an embodiment of the present invention.

FIG. 1 illustrates a block schematic diagram of a two-stage, off-line switching power supply 100 in accordance with an embodiment of the present invention. As shown in FIG. 1, a power factor correction (PFC) stage 102 has an input coupled to an alternating-current (AC) source $V_{AC}$. The PFC stage 102 performs rectification on the AC input signal and maintains current drawn from the AC source substantially in phase with the AC voltage so that the power supply 100 appears as a resistive load to the AC source.

The PFC stage 102 generates a loosely regulated voltage, $V_{DC}$, which is provided as input to a DC-to-DC converter 104. Using the input $V_{AC}$, the DC-to-DC converter stage 104 generates a voltage-regulated, direct-current (DC) output, $V_O$, which can be used to power a load. The level of $V_{DC}$ is preferably at a higher voltage and is more loosely regulated than the output $V_O$ of the DC-to-DC converter stage 104. The nominal level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC. However, due to changes in the AC source, for example, the output $V_{DC}$ of the PFC stage 102 may, at times, fall below its nominal level.

Figure 2:
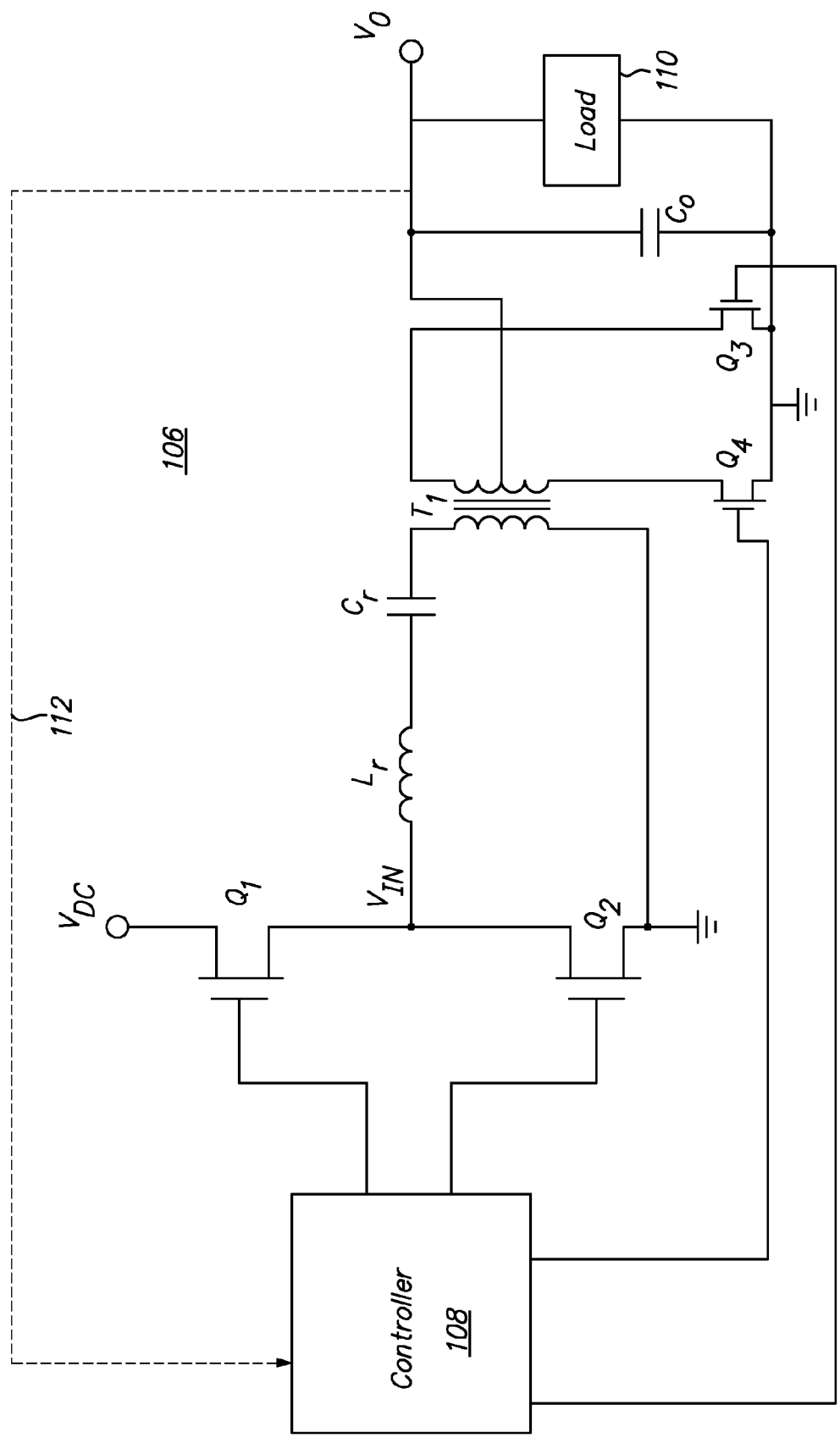
FIG. 2 illustrates a schematic diagram of a resonant switching converter in accordance with an embodiment of the present invention.

FIG. 2 illustrates a schematic diagram of a resonant switching converter 106 in accordance with an embodiment of the present invention. The resonant switching converter 106 may be, for example, included in the DC-to-DC converter 104 of FIG. 1. Referring to FIG. 2, the converter 106 includes a half-bridge switching inverter that includes a pair of series-connected transistor switches $Q_1$ and $Q_2$. A power source, such as the output $V_{DC}$ generated by the PFC stage 102 (FIG. 1), is coupled to a first terminal of the transistor switch $Q_1$. A second terminal of the transistor switch $Q_1$ is coupled to a first terminal of a transistor switch $Q_2$ to form an intermediate node. The second terminal of the transistor switch $Q_2$ is coupled to a ground node. A control terminal of each of the transistor switches $Q_1$ and $Q_2$ is coupled to a controller 108. The controller 108 controls opening and closing of the pair of transistor switches $Q_1$ and $Q_2$. When the switch $Q_1$ is closed and the switch $Q_2$ is open, the intermediate node is coupled to $V_{DC}$. This raises a voltage, $V_{IN}$, at the intermediate node. When the switch $Q_1$ is open and the switch $Q_2$ is closed, the intermediate node is coupled to ground. This lowers the voltage, $V_{IN}$, at the intermediate node. While FIG. 2 shows a half-bridge switching inverter, it can be replaced with a full-bridge switching inverter.

Energy storage elements are coupled to the intermediate node. Particularly, as shown in FIG. 2, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage V at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $Q_3$. A second terminal of the secondary winding of the transformer $T_1$ is coupled to a first terminal of a transistor switch $Q_4$. A second terminal of the transistor switch $Q_3$ and a second terminal of the transistor switch $Q_4$ are coupled to a ground node. A control terminal of each of the transistor switches $Q_3$ and $Q_4$ is coupled to the controller 108. The controller 108 controls opening and closing of the pair of transistor switches $Q_3$ and $Q_4$.

A center tap of the secondary winding of the transformer $T_1$ is coupled to a first terminal of a capacitor $C_O$. A second terminal of the capacitor $C_O$ is coupled to a ground node. An output voltage, $V_O$, is formed across the capacitor $C_O$. A load 110 may be coupled across the capacitor $C_O$ to receive the output voltage $V_O$. The output voltage $V_O$, or a voltage that is representative of the output voltage, is fed back to the controller 108 via a feedback path 112.

Adjusting the switching frequency of the transistor switches $Q_1$ and $Q_2$ adjusts impedance of the resonant tank and, therefore, adjusts the amount of power delivered to the load 110. More particularly, decreasing the switching frequency tends to increase the power delivered to the load 110. Increasing the switching frequency tends to reduce the power delivered to the load 110. By monitoring the level of the output voltage $V_O$ via a feedback path 112, the controller 108 can adjust the switching frequency to maintain the output voltage $V_O$ constant despite changes in the power requirements of the load 110 and despite changes in the level of the input $V_{DC}$. This is referred to as frequency modulation or FM modulation.

As power is transferred to the load 110 via the transformer $T_1$, current through the secondary winding of the transformer $T_1$ alternates in direction. The transistor switches $Q_3$ and $Q_4$ perform synchronous rectification. This is accomplished by the controller 108 turning the transistor switches $Q_3$ and $Q_4$ on and off at appropriate times so that the current through each of the switches $Q_3$ and $Q_4$ is in one direction only. Generally, the transistor switch $Q_3$ is on while the transistor switch $Q_4$ is off. Similarly, the transistor switch $Q_4$ is on while the transistor switch $Q_3$ is off. Synchronous rectification ensures that power is delivered to the load 110 and prevents reverse currents which could be reflected to the resonant tank. Such reverse current could result in unwanted oscillations, intractable behavior and device failure.

Figure 3:
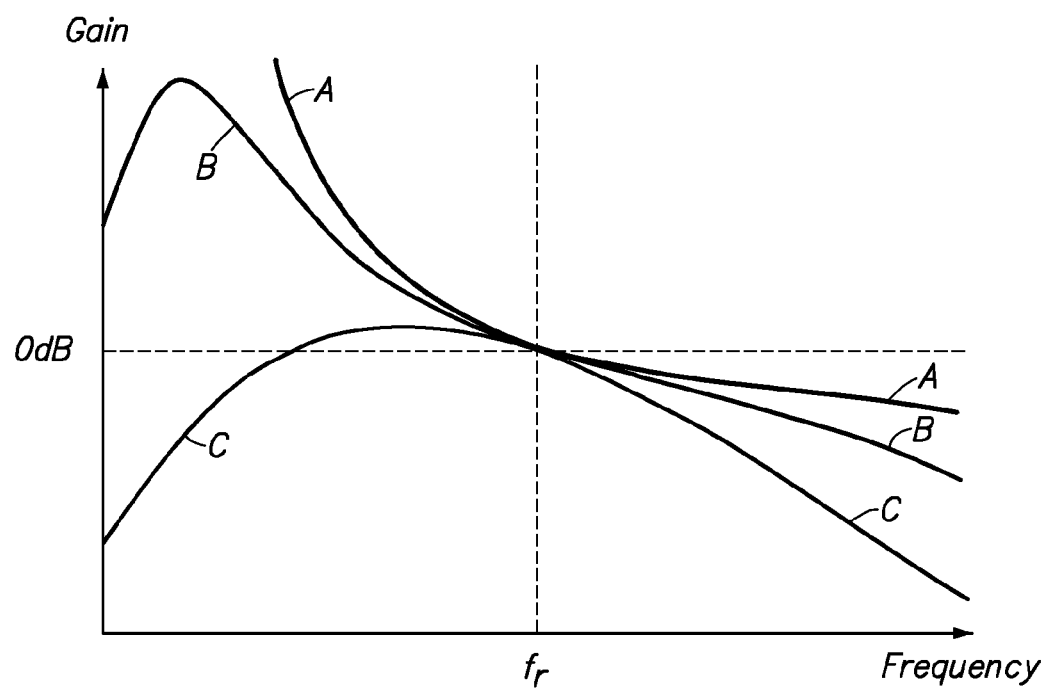
FIG. 3 illustrates a graph showing simulated gain vs. frequency for a resonant switching converter in accordance with an embodiment of the present invention.

FIG. 3 illustrates a graph showing simulated gain vs. frequency for the series resonant switching converter 106 in accordance with an embodiment of the present invention. As shown in FIG. 3, frequency is represented by the horizontal axis, increasing from left to right, and gain is represented by the vertical axis, increasing from bottom to top. A series of gain curves A, B and C, are shown. The curve C represents a nominal, "full load," while the curve B represents a loading of approximately fifty percent (50%) of the full load, and the curve A represents a loading of approximately twenty percent (20%) of the full load.

The gain of the resonant switching converter 106 at the resonant frequency of the resonant tank is 1.0 (or 0 dB). The resonant frequency may be computed as:

$$f_r = \frac{1}{2\pi\sqrt{L_r C_r}}.$$

The inventive resonant switching converter 106 can be operated at frequencies above and at frequencies below the resonant frequency of the resonant tank. More particularly, at frequencies above the resonant frequency, the controller 108 operates in a frequency modulation (FM) mode in which the transistor switches $Q_1$, $Q_2$, $Q_3$ and $Q_4$ are operated at the same switching frequency as each other using frequency modulation. The frequency is modulated to control the power delivered to the load 110 and to maintain the load voltage $V_O$ constant using feedback (e.g. via the feedback path 112). Also, in this mode, the transistor switches $Q_1$, $Q_2$, $Q_3$ and $Q_4$ are all preferably operated at substantially a fifty percent (50%) duty cycle. For each switching cycle of a fifty-percent duty cycle, the on-time of each transistor switch is one-half of the switching period. In practice, the maximum duty cycle may be just under fifty percent (50%) in order to avoid shoot-through in which one of the transistor switches of a pair has not yet turned off before the other one is turned on. The above-described FM mode of operation may be employed when the input voltage, $V_{DC}$, is near its nominal level and the load 110 is drawing at or near maximum power of the switching converter (also referred to as being at "full load"). In this mode, the maximum gain of the resonant switching converter 106 is 1.0 (or 0 dB), which is achieved at the resonant frequency.

In the event of a change in the level of the voltage, $V_{DC}$, supplied to the switching converter 106, the switching frequency is changed in order to maintain a constant output voltage $V_O$. For example, the level of $V_{DC}$ may fall due to an interruption or lowering of the level of the AC supply or if the AC source is disconnected. In this case, the switching frequency can be lowered in order to compensate. If, by using frequency modulation, the switching frequency falls below the resonant frequency of the resonant tank, the controller 108 transitions to a mode in which the duty cycle of the transistor switches $Q_3$ and $Q_4$, that perform synchronous rectification on the secondary side of the transformer $T_1$, is reduced to a level below fifty percent (50%).

More particularly, at frequencies below the resonant frequency, the controller 108 may employ pulse-width modulation (PWM) to control switching in addition to the frequency modulation described above. In this second mode of operation, the duty-cycle (i.e. the portion of each switching cycle that each transistor switch is on) for the transistor switches $Q_3$ and $Q_4$ is reduced when the switching frequency is below the resonant frequency. In this mode, the maximum gain of the resonant switching converter 106 can be greater than 1.0 (or 0 dB), as shown in FIG. 3. Also in this mode, the transistor switches $Q_1$, $Q_2$, $Q_3$ and $Q_4$ are preferably operated at the same switching frequency as each other using frequency modulation. In this mode, the transistor switches $Q_1$ and $Q_2$, are preferably operated at substantially a fifty percent (50%) duty cycle. However, for the transistor switches $Q_3$ and $Q_4$, the duty cycle is preferably adjusted by an amount that is related to the switching frequency. More particularly, as the switching frequency is reduced, the duty cycle for the transistor switches $Q_3$ and $Q_4$ is reduced. Conversely, as the switching frequency is increased, the duty cycle for the transistor switches $Q_3$ and $Q_4$ is increased. Should the switching frequency be increased to the point that it returns to a level above the resonant frequency, then the duty cycle of the transistor switches $Q_3$ and $Q_4$ is returned to fifty percent (50%) and the controller 108 returns to the FM modulation mode in which all of the transistor switches $Q_1$, $Q_2$, $Q_3$ and $Q_4$ are operated at the same duty cycle and frequency as each other.

Reducing the duty cycle of the switches $Q_3$ and $Q_4$ at these lower switching frequencies tends to prevent reverse current in the transistor switches $Q_3$ and $Q_4$. This, in turn, tends to prevent the reverse currents from being reflected to the primary side of the transformer $T_1$ where they may interfere with operation of the resonant tank (e.g. by causing in unwanted oscillations, intractable behavior and device failure). In addition, the reduced duty cycle of the switches $Q_3$ and $Q_4$ allows the converter to operate for a longer period of time at a reduced input level. Therefore, hold-up time requirements (i.e. the amount of time that the converter output remains within tolerance after the input power source is disconnected) are more easily met. This means that a capacitor at the input of the converter (across which the voltage $V_{DC}$ is generated) can be smaller than otherwise. In addition, the transformer $T_1$ can also be smaller than otherwise.

In an embodiment, the duty cycle of the switches $Q_3$ and $Q_4$ is reduced so that the on-time of each of the transistor switches $Q_3$ and $Q_4$ remains substantially constant and equal to one-half the switching period at the resonant frequency. Therefore, the on-time may be given as:

$$\text{on-time} = \frac{1}{2f_r}.$$

The on-time is the duration of time that each switch is on during one switching cycle. As the switching frequency is reduced, the switching period is increased. This is because the period is inversely related to the frequency. Therefore, because the on-time remains constant, the off-time (i.e. the remainder of the switching period) is increased. In another embodiment, the on-time may be less than one-half the switching period at the resonant frequency; in this case, the on-time may also be substantially constant.

Rather than adjusting the duty cycle for the transistor switches $Q_3$ and $Q_4$ based on the switching frequency as described above, the current through the transistors $Q_3$ and $Q_4$ may be sensed when the switching is below the resonant frequency. For example, the voltage across a resistor placed in series with each of the transistor switches $Q_3$ and $Q_4$ may be sensed. When the current falls to zero or near zero, this indicates that the corresponding transistor should be turned off to prevent the current from falling below zero (i.e. reversing direction). While this current-sensing embodiment is expected to be feasible, it is less preferred since sensing the current tends to increase complexity of the converter and uses power (e.g. in the sensing resistors) which tends to reduce efficiency.

As explained above in connection with the FM modulation mode, if changes in the load 110 cause it to draw less power, the switching frequency of the transistor switches $Q_1$, $Q_2$, $Q_3$ and $Q_4$ is increased in order to maintain a constant level for the output voltage $V_O$. Increasing the switching frequency, however, can reduce efficiency since switching losses (e.g. power required to turn the switching transistors on and off) tend to increase in relation to other losses. Therefore, in order to increase efficiency under light load conditions, the controller 108 may enter a third mode of operation in which the duty cycle of all of the switches $Q_1$, $Q_2$, $Q_3$ and $Q_4$ is reduced while keeping the duty cycle of each switch the same as the others. This mode is entered when the switching frequency reaches a specified frequency level. In this mode, FM modulation and PWM are used to control switching. More particularly, as the power requirements of the load 110 are reduced, the switching frequency of the switches $Q_1$, $Q_2$, $Q_3$ and $Q_4$ is increased in accordance with FM modulation and, simultaneously, the duty cycle of the switches $Q_1$, $Q_2$, $Q_3$ and $Q_4$ is reduced in accordance with PWM modulation. The amount by which the duty cycle is reduced may be related to the level of the switching frequency. Alternatively, when the switching frequency rises above the specified frequency level, the duty cycle may be changed to a specified value below fifty percent (50%). This mode of operation is described in more detail in U.S. patent application Ser. No. 11/830,738, filed on Jul. 30, 2007 (U.S. Patent Pub. No. 2009/0034298), the entire contents of which are hereby incorporated by reference.

Figure 4:
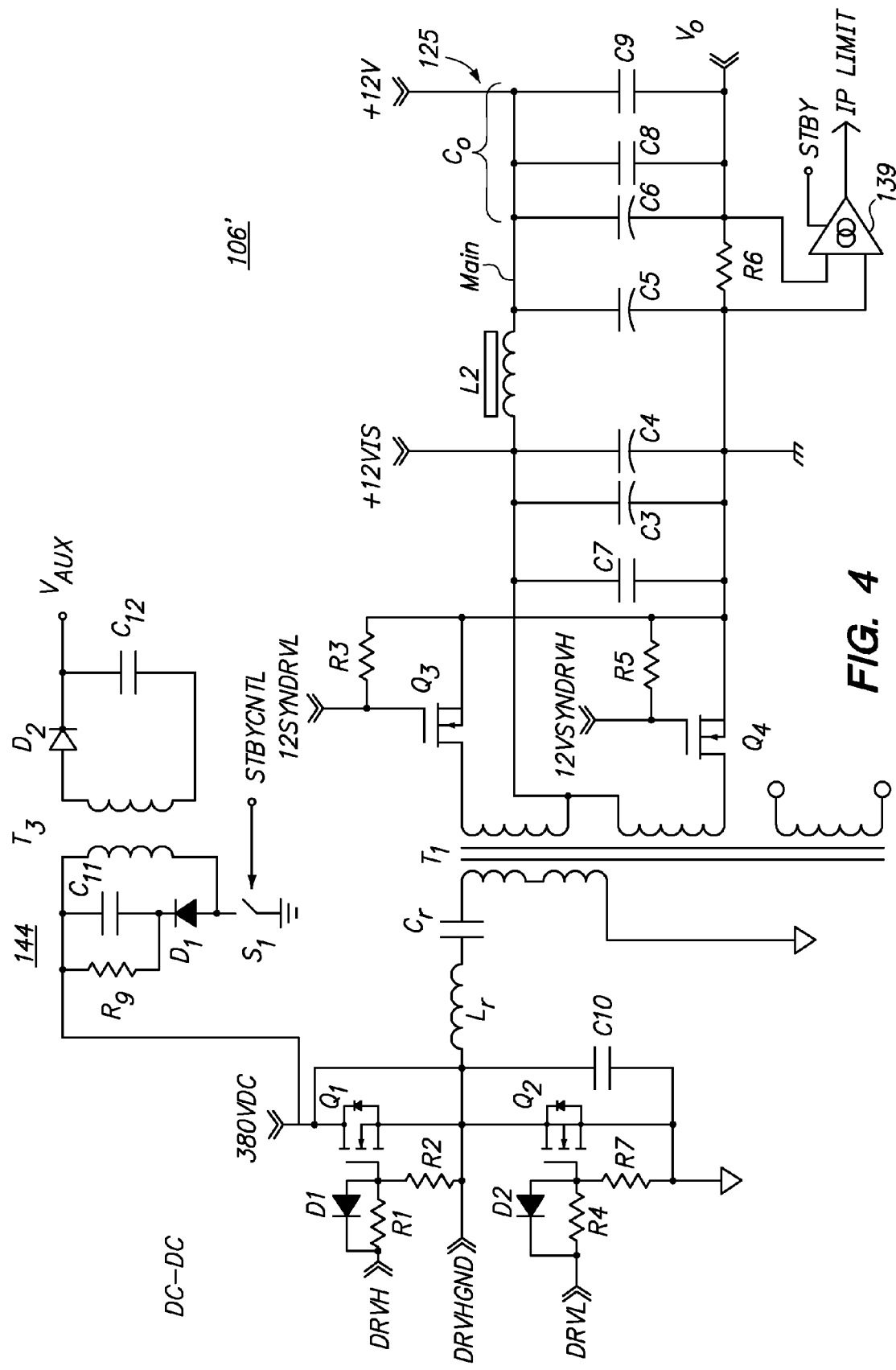
FIG. 4 illustrates a schematic diagram of a resonant switching converter in accordance with an embodiment of the present invention.

FIG. 4 illustrates a schematic diagram of a resonant switching converter 106' in accordance with an embodiment of the present invention. The switching converter 106' of FIG. 4 operates in essentially the same manner as the switching converter 106 illustrated in FIG. 2, though FIG. 4 shows additional details not shown in FIG. 2. Like reference numerals are used in FIG. 4 for elements having a functional correspondence with elements of FIG. 2. Thus, FIG. 4 shows that the transistor switches $Q_1$ and $Q_2$ form the half-bridge inverter. In addition, inductor $L_r$ and capacitor $C_r$ form the resonant tank. The half-bridge inverter is coupled to the resonant tank which is, in turn, coupled to the primary side of the transformer $T_1$. Switches $Q_3$ and $Q_4$ are coupled to the secondary side of the transformer $T_1$ and perform synchronous rectification. The regulated output voltage $V_O$ is formed across capacitor $C_O$. As shown in FIG. 4, the capacitor $C_O$ comprises capacitors $C_6$, $C_8$ and $C_9$. An output stage 125 of the converter 106' includes the output capacitor $C_O$ and has an input terminal "Main" coupled to receive an output current from an inductor L2. It will be apparent that the switching converter 106' of FIG. 4 is exemplary and that alterations can be made. For example, a different resonant tank configuration, such as a parallel resonant tank, may be employed. Also, rather, than a half-bridge inverter, a full-bridge inverter may be employed.

Figure 5:
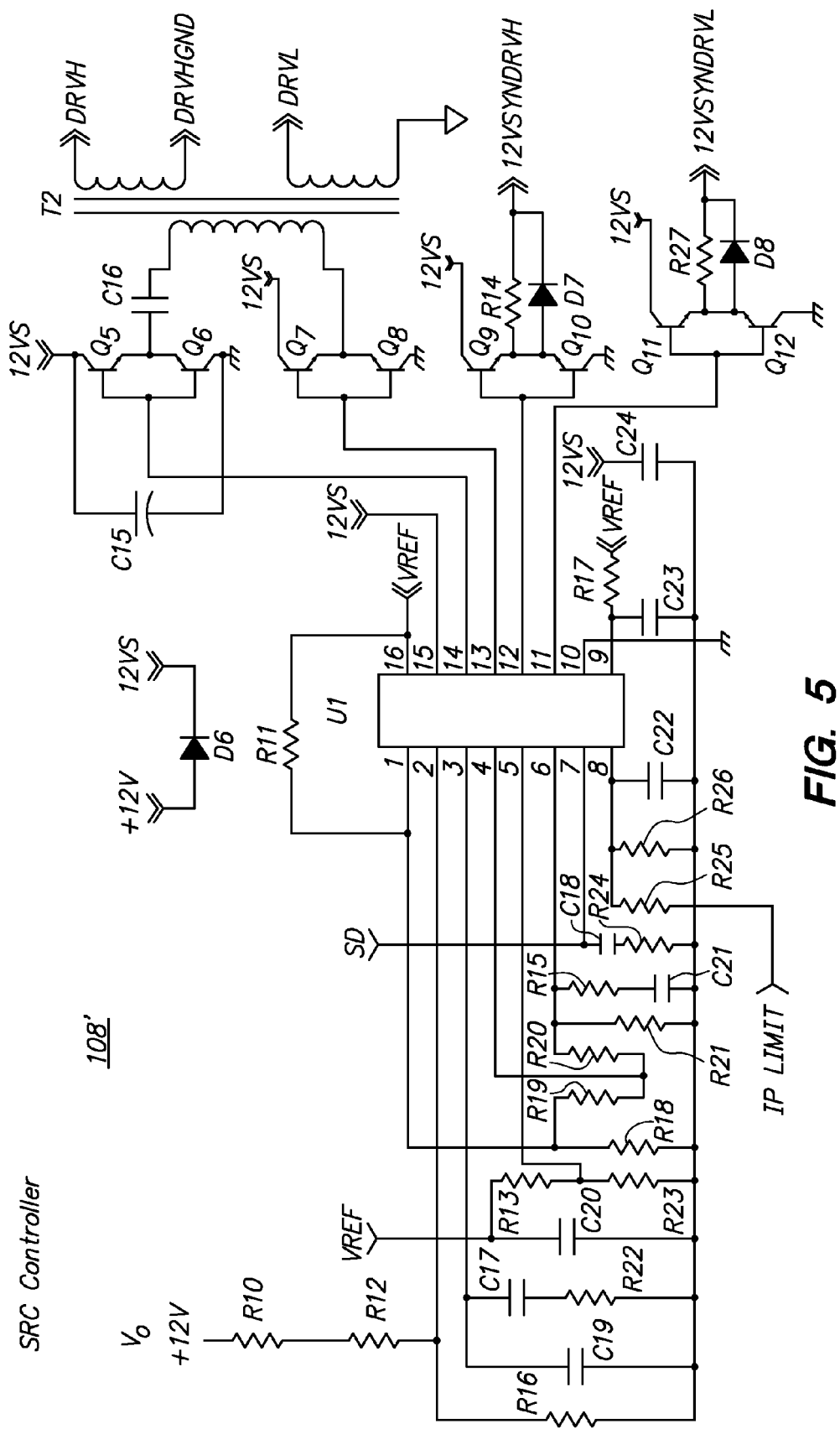
FIG. 5 illustrates a block schematic diagram of a controller for a resonant switching converter in accordance with an embodiment of the present invention.

FIG. 5 illustrates a block schematic diagram of a controller 108' for a resonant switching converter in accordance with an embodiment of the present invention. The controller 108' of FIG. 5 operates as described above in connection with the controller 108 shown in FIG. 2 to control the transistor switches $Q_1$, $Q_2$, $Q_3$ and $Q_4$. More particularly, as shown in FIGS. 4 and 5, a signal DRVH is generated by the controller 108' and used to drive the transistor switch $Q_1$. Similarly, a signal DRVL is generated by the controller 108' and used to drive the transistor switch $Q_2$. A signal 12VSYNDRVL is generated by the controller 108' and used to drive the transistor switch $Q_3$. In addition, a signal 12VSYNDRVH is generated by the controller 108' and used to drive the transistor switch $Q_4$. As shown in FIG. 5, transistors $Q_5$, $Q_6$, $Q_7$ and $Q_8$, along with a transformer $T_2$ generate drive signals for the transistor switches $Q_1$ and $Q_2$. Transistors $Q_9$, $Q_{10}$, $Q_{11}$ and $Q_{12}$ generate drive signals for the transistor switches $Q_3$ and $Q_4$.

Figure 6:
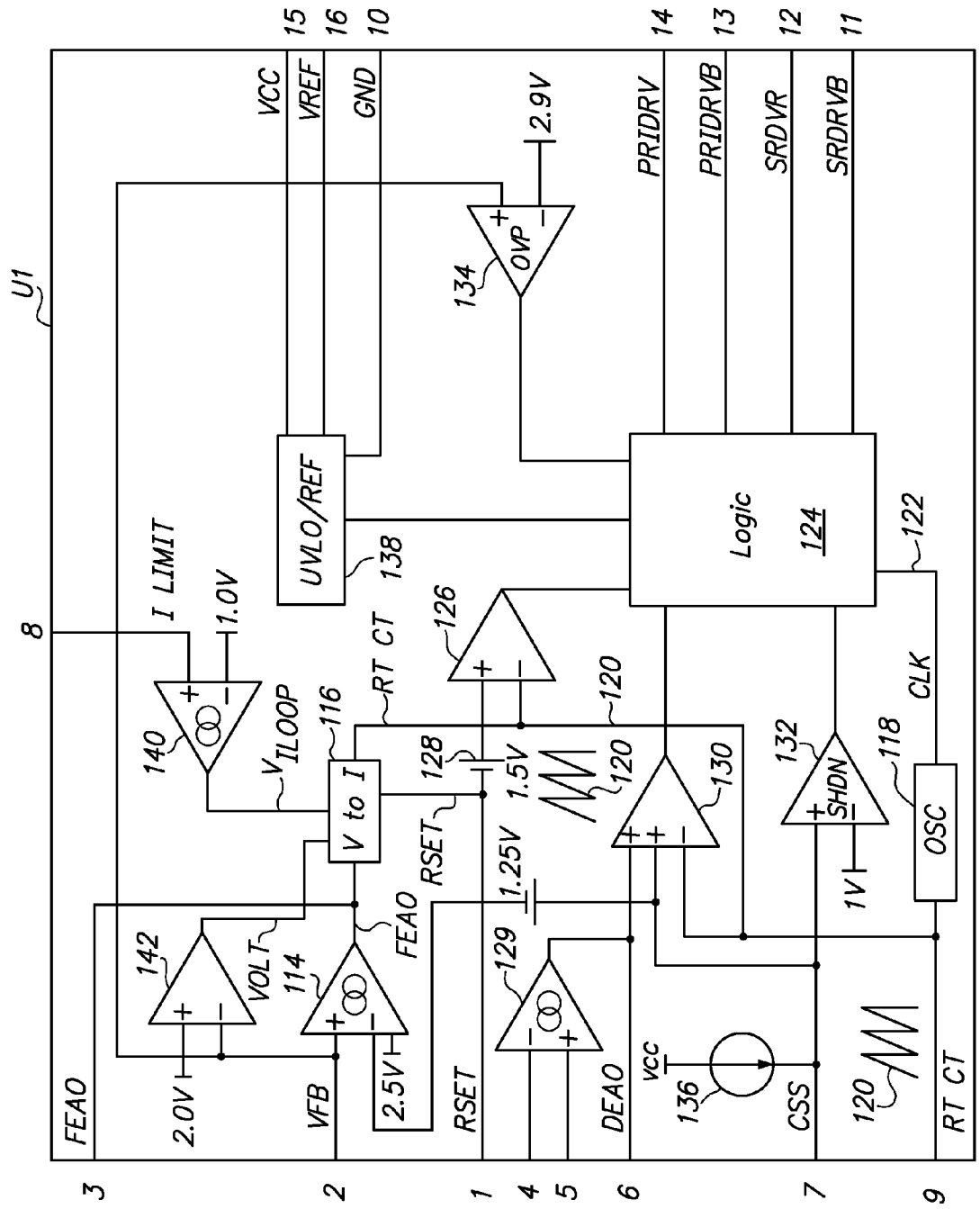
FIG. 6 illustrates a block schematic diagram of a controller integrated circuit for a resonant switching converter in accordance with an embodiment of the present invention.

In a preferred embodiment, the controller 108' includes a controller integrated circuit $U_1$. FIG. 6 illustrates a block schematic diagram of the controller integrated circuit $U_1$ for the resonant switching converter 106' and controller 108' in accordance with an embodiment of the present invention. For certain embodiments, the integrated circuit $U_1$ may be obtained from Champion Microelectronic Corporation, whose address is 5F, No. 11, Park Ave. II, Hsinchu Science-Based Industrial Park, Hsinchu City, Taiwan.

Referring to FIGS. 4, 5 and 6, opening and closing of each of the switches $Q_1$, $Q_2$, $Q_3$ and $Q_4$ is controlled by the controller 108', as described above, to form the output voltage $V_O$. The output, $V_O$, is coupled to a resistive divider comprising resistors $R_{10}$, $R_{12}$ and $R_{16}$ (FIG. 5) to form a feedback signal VFB that is representative of the level of the output voltage $V_O$. The feedback signal VFB is provided to the integrated circuit $U_1$ (FIG. 6). Within the integrated circuit $U_1$, the signal VFB is coupled to a first input of an amplifier 114. The amplifier 114 compares the signal VFB to a reference voltage, which may be for example, 2.5 volts, to form an error signal FEAO at its output. The error signal FEAO is representative of a difference between the output voltage $V_O$ and a desired level of the output voltage. The error signal FEAO is applied to a voltage-to-current (V to I) converter 116. A first output RT CT of the voltage-to-current converter 116 is coupled to an oscillator 118. The oscillator 118 generates a ramp signal 120 and a clock signal 122.

The clock signal 122 is coupled to a logic block 124 which generates drive signals that control switching of the transistor switches $Q_1$, $Q_2$, $Q_3$ and $Q_4$. In the FM modulation mode, the logic block 124 preferably generates the drive signals such that they have a fifty percent (50%) duty cycle. This may be accomplished, for example, by employing toggle flip-flips within the logic block 124 that are controlled by the clock signal 122 as well as other logic devices, such as logic gates.

Referring to FIG. 5, a first terminal of a resistor $R_{17}$ is coupled to a reference voltage source VREF. A second terminal of the resistor $R_{17}$ is coupled to a first terminal of a capacitor $C_{23}$ and to an RTCT pin of the integrated circuit $U_1$. A second terminal of the capacitor $C_{23}$ is coupled to a ground node. The values of $R_{17}$ and $C_{23}$ determine the nominal frequency of the ramp signal 120 generated by the oscillator 118.

FM modulation is accomplished as follows: When the output voltage $V_O$ rises with respect to a desired level for the output voltage, this causes the error signal FEAO to rise. In response, the output current level of the voltage-to-current converter 116 is increased. This tends to charge the capacitor $C_{23}$ more quickly which increases the slope of the ramp signal 120 and also increases its frequency. As a result, the frequency of the clock signal 122 generated by the oscillator 118 is also increased. Therefore, this increases the switching frequency of the transistor switches $Q_1$, $Q_2$, $Q_3$ and $Q_4$. Conversely, when the output voltage $V_O$ falls with respect to a desired level for the output voltage, this causes the error signal FEAO to fall. In response, the output current level of the voltage-to-current converter 116 is reduced. This tends to charge the capacitor $C_{23}$ more slowly which decreases the slope of the ramp signal 120 and also reduces its frequency. As a result, the frequency of the clock signal 122 generated by the oscillator 118 is also reduced. Therefore, this reduces the switching frequency of the transistor switches $Q_1$, $Q_2$, $Q_3$ and $Q_4$. In this manner, the switching frequency of the transistor switches $Q_1$, $Q_2$, $Q_3$ and $Q_4$ is raised or lowered according to the level of the output voltage $V_O$. Accordingly, these elements form a voltage controlled feedback loop in which FM modulation is used to adjust the switching frequency of the transistor switches $Q_1$, $Q_2$, $Q_3$ and $Q_4$ to maintain the output voltage $V_O$ constant.

The ramp signal 120 is also applied to an inverting input of a comparator 126. A non-inverting input of the comparator 126 is coupled to receive a signal RSET, which is offset by a 1.5 volt DC offset generator 128. An output of the comparator 126 is coupled to the logic block 124. The signal, RSET, is formed by voltage divider comprising resistors $R_{11}$ and $R_{18}$ (FIG. 5) coupled to the reference voltage VREF. A second output of the voltage-to-current converter 116 is coupled to the voltage divider so as to influence the level of RSET. When the level of the error signal FEAO rises, this tends to increase the current generated by the voltage-to-current converter 116. As a result, the level of RSET rises. Conversely, when the level of the error signal FEAO falls, this reduces the current generated by the voltage-to-current converter 116. A result, the level of RSET falls. Therefore, the level of RSET is influenced by the level of FEAO. The level of RSET is related to the switching frequency of the transistor switches $Q_1$, $Q_2$, $Q_3$ and $Q_4$.

When the level of RSET is above 1.5 volts, the non-inverting input of the comparator 126 is greater than 3.0 volts. This is because the voltage offset generator 128 adds 1.5 volts to the level of RSET. Under these conditions, the output of the comparator 126 remains high and has no effect on the switching duty cycle. When the level of RSET is at approximately 1.5 volts, this corresponds to the transistor switches $Q_1$, $Q_2$, $Q_3$ and $Q_4$ operating at the resonant frequency of the resonant tank. Thus, when the switching frequency of the transistor switches $Q_1$, $Q_2$, $Q_3$ and $Q_4$ falls below the resonant frequency, the level of RSET falls below 1.5 volts and the non-inverting input of the comparator 126 falls below 3.0 volts. When this happens, the level at the non-inverting input of the comparator 126 is below the peak level of the ramp signal 120. As a result, the output of the comparator 126 toggles for each switching cycle. In addition, the pulse width at the output of the comparator 126 is related to the amount by which the switching frequency falls below the resonant frequency. This signal causes the logic block 124 to reduce the switching duty cycle of the transistor switches $Q_3$ and $Q_4$ that perform synchronous rectification by an amount that is related to the switching frequency. As explained above, the duty cycle of the transistor switches $Q_1$ and $Q_2$ preferably remains at fifty percent (50%) despite the reduced duty cycle of transistor switches $Q_3$ and $Q_4$.

To summarize, the level of RSET changes in response to the level of the second output of the voltage-to-current converter 116, which is controlled in response to the level of the error signal FEAO. When the level of the error signal FEAO causes the switching frequency to fall below the resonant frequency, this also causes the level of RSET to fall below 1.5 volts. When this occurs, the controller enters the second mode of operation, as described above, in which the switching duty cycle of the transistor switches $Q_3$ and $Q_4$ is reduced.

Referring to FIG. 6, a non-inverting input of an amplifier 129 is coupled to a voltage divider that comprises resistors $R_{13}$ and $R_{23}$ (FIG. 5). More particularly, a reference voltage VREF is coupled to a first terminal of the resistor $R_{13}$. A second terminal of the resistor $R_{13}$ is coupled to a first terminal of the resistor $R_{23}$ and to the non-inverting input of the amplifier 129. A second terminal of the resistor $R_{23}$ is coupled to a ground node. Accordingly, the non-inverting input of an amplifier 129 is held at a fixed voltage level which may be, for example, 3.0 volts. An inverting input of the amplifier 129 is coupled to RSET through a resistor $R_{19}$ (FIG. 5). An output of the amplifier 129 is coupled to its inverting input through a resistor $R_{20}$ (FIG. 5). A signal DEAO is formed at the output of the amplifier 129. The signal DEAO is coupled to a non-inverting input of a comparator 130. An inverting input of the comparator 130 is coupled to receive the ramp signal 120.

While the level of RSET is below a specified level, the level of DEAO is above 3.0 volts. This causes the output of the comparator 130 to remain high because the ramp signal 120 does not exceed 3.0 volts. Under these conditions, the comparator 130 has no effect on the duty cycle of the transistor switches $Q_1$, $Q_2$, $Q_3$ and $Q_4$. However, under light load conditions, the level of $V_O$ tends to rise, as does the level of RSET. When the level of RSET rises above the specified level, the level of DEAO falls below 3.0 volts by an amount that is related to the level of RSET. The comparator 130 now compares the ramp signal 120 to a level that is below 3.0 volts. As a result, the power supply enters the third mode of operation and the output of the comparator 130 toggles for each switching cycle. In addition, the pulse width at the output of the comparator 130 is related to the level of RSET. This signal causes the logic block 124 to reduce the switching duty cycle of the transistor switches $Q_1$, $Q_2$, $Q_3$ and $Q_4$ by an amount that is related to the level of RSET. The specified level of RSET can be selected based on the selection of resistor values for $R_{19}$ and $R_{20}$.

To summarize, when the load 110 draws a low level of power, this causes the level of RSET to rise. When the level of RSET exceeds a specified level, the controller enters the third mode of operation, as described above, in which the switching duty cycle of the transistor switches $Q_1$, $Q_2$, $Q_3$ and $Q_4$ is reduced. This third mode increases efficiency by reducing switching losses at high switching frequencies.

As shown in FIG. 6, a comparator 132 provides a soft-start feature while a comparator 134 provides for over-voltage protection. For soft-start, a capacitor $C_{18}$ (FIG. 5) is initially discharged and, then, upon start-up, a current source 136 charges the capacitor $C_{18}$. When the voltage on the capacitor $C_{18}$ reaches a specified level (e.g. 1.0 volt), the comparator 132 enables the transistor switches $Q_1$, $Q_2$, $Q_3$ and $Q_4$ to commence switching in a soft-start mode. Also, when the level of the feedback signal VFB exceeds a specified level, the comparator 132 disables switching of the transistor switches $Q_1$, $Q_2$, $Q_3$ and $Q_4$. In addition, an under-voltage lock-out and reference voltage generator 138 generates the reference voltage VREF and disables switching in under-voltage conditions.

In accordance with an embodiment, upon start-up of the power converter 106', switching of the transistor switches $Q_1$ and $Q_2$ is commenced and, then, after a delay, switching of the transistor switches $Q_3$ and $Q_4$ is commenced. For example, when the voltage on the soft-start capacitor $C_{18}$ reaches a first specified level (e.g. 1.0 volt), the transistor switches $Q_1$ and $Q_2$ may commence switching. Then, when the voltage on the capacitor $C_{18}$ reaches a second specified level, higher than the first (e.g. 5.0 volts), the transistor switches $Q_3$, and $Q_4$ may commence switching. This tends to result in more predictable switching behavior upon start-up. This feature may be implemented, for example, by a comparator that compares the level of the voltage on the capacitor $C_{18}$ to reference voltages of the specified levels and whose output disables/enables the transistor switches $Q_3$ and $Q_4$ via connection to the logic block 124.

In accordance with an embodiment, output current is monitored during operation of the converter by generating a voltage signal IP ILIMIT (FIGS. 4 and 5) that is representative of the output current delivered to the load 110. This voltage may be generated by a current-sensing impedance (e.g. sensing resistor R6 shown in FIG. 4).

Referring to FIG. 4, inputs of an amplifier 139 are coupled across the current sensing resistor R6. The amplifier 139 can be a transconductance amplifier. The amplifier 139 is preferably a rail-to-rail amplifier meaning that its inputs and output can range anywhere between the amplifier's power supply rails. A current representative of the output current passes through the sensing resistor R6. The signal IP LIMIT is generated at the output node of the amplifier 139.

Referring to FIG. 5, the signal IP LIMIT is coupled to a first terminal of a resistor $R_{25}$. A second terminal of the resistor $R_{25}$ is coupled to a first terminal of a resistor $R_{26}$ and to a first terminal of a capacitor $C_{22}$. A second terminal of the capacitor $C_{22}$ and a second terminal of the resistor $R_{26}$ are coupled to a ground node. A voltage signal ILIMIT is formed at the second terminal of the resistor $R_{25}$ and is coupled to a pin 8 of the integrated circuit $U_1$ (FIG. 5). The resistors $R_{25}$ and $R_{26}$ and the capacitor $C_{22}$ act as a smoothing filter. The signal ILIMIT is, therefore, a smoothed (i.e. filtered) version of the signal IP LIMIT.

When the output current, as represented by the signal ILIMIT, exceeds a threshold level, this preferably increases the switching frequency in an effort to limit the level of the output current. Thus, under these conditions, the switching converter 106' may function as a constant current source. This current-limiting feature may be implemented by an amplifier 140 (FIG. 6) and by the voltage to current converter 140. As shown in FIG. 6, a non-inverting input of the amplifier 140 is connected to the voltage signal ILIMIT while an inverting input of the amplifier 140 is connected to a reference voltage level. The output VILOOP of the amplifier 140 is connected to the input of the voltage-to-current converter 116, which influences switching of the transistor switches $Q_1$, $Q_2$, $Q_3$ and $Q_4$ as described herein. The amplifier 140 may be enabled only when the output current exceeds the specified threshold level.

When the amplifier 140 is enabled, its output VILOOP can be used to influence the level of the signal RSET beyond the level that it would be if controlled by voltage feedback alone. This increases the switching frequency in an effort to limit the level of the output current. As a result, the switching converter will generally be operating above the resonant frequency. In this case, the duty cycle of the switches $Q_1$, $Q_2$, $Q_3$ and $Q_4$ can be equal to each other and at substantially fifty percent (50%) duty cycle (as in the first mode of operation described herein).

As described above, the output VILOOP of the amplifier 140 is coupled to the input of the voltage-to-current converter 116, which affects switching by influencing the level of the signal RSET. In an alternative embodiment, the output of the amplifier 140 can be coupled to the output of the amplifier 114. In this case, operation of the amplifier 140 can affect switching by influencing the level of FEAO.

The current limiting is preferably performed in a feedback loop. Specifically, as a result of operation of current sensing components R6, amplifier 139, amplifier 140 and voltage to current converter 116, increases in the output current will tend to be counteracted by increasing the switching frequency, which has the effect of reducing the output current. Conversely, decreases in the output current will tend to be counteracted by decreasing the switching frequency, which has the effect of increasing the output current. In the event that the output current falls below the threshold, then the amplifier 140 will disable the current limiting.

While current limiting is enabled by the amplifier 140, the duty cycle of the switches $Q_1$, $Q_2$, $Q_3$ and $Q_4$ can be reduced in accordance with pulse-width modulation according to the third mode of operation described herein. Specifically, this third mode of operation is enabled when the switching frequency exceeds a threshold indicative of a light load condition. However, in a preferred embodiment, while the current limiting is enabled by the amplifier 140, the duty cycle of the switches $Q_1$, $Q_2$, $Q_3$ and $Q_4$ is maintained equal to each other and at substantially fifty percent (50%) duty cycle even if the light load switching frequency threshold is exceeded. In other words, entry into the third mode of operation is preferably inhibited while the amplifier 140 is enabled. Inhibiting the third mode of operation in this manner tends to reduce stress placed on the switches $Q_1$, and $Q_2$.

In an embodiment, when the level of the output $V_O$ of the DC-to-DC converter to falls below a threshold, the duty cycle of the switches $Q_1$, $Q_2$, $Q_3$ and $Q_4$ is held at or above the resonant frequency. As shown in FIG. 6, this can be implemented by a comparator 142 along with the voltage-to-current converter 116. The voltage feedback signal VFB can be coupled to a first input of the comparator 142. A reference voltage of, for example, 2.0 volts, can be coupled to a second input of the comparator 142. An output VDCT of the comparator 142 can be coupled to the voltage-to-current converter 116. When the feedback signal VFB falls below the threshold, this causes the output VDCT of the comparator 142 to change which, in turn, causes the voltage-to-current converter 116 to hold the level of RSET at approximately 1.5 volts, which causes the transistor switches $Q_1$, $Q_2$, $Q_3$ and $Q_4$ to operate at or above the resonant frequency of the resonant tank. This essentially clamps the level of RSET and thus forces the switching frequency to be at or above the resonant frequency.

Figure 7:
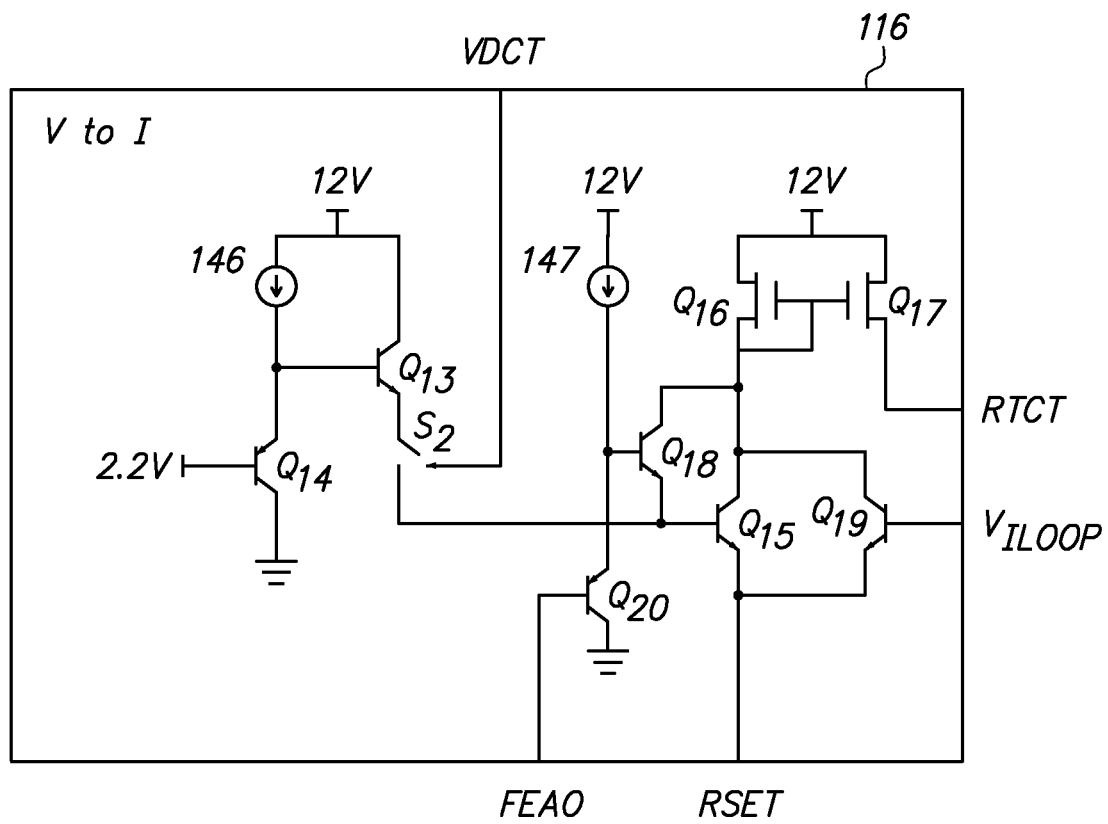
FIG. 7 illustrates a schematic diagram of a voltage to current converter in accordance with an embodiment of the present invention.

FIG. 7 illustrates a schematic diagram of a voltage to current converter 116 in accordance with an embodiment of the present invention. As shown in FIG. 7, a supply voltage is coupled to a first terminal of a current source 146, to a first terminal of current source 147 and to an input terminal of a transistor $Q_{13}$. A second terminal of the current source 146 is coupled to a control terminal of the transistor $Q_{13}$ and to an input terminal of a transistor $Q_{14}$. A control terminal of the transistor $Q_{14}$ is coupled to a reference voltage of, for example, 2.2 volts. An output terminal of the transistor $Q_{14}$ is coupled to a ground node. An output terminal of the transistor $Q_{13}$ is coupled to a first terminal of a switch $S_2$. A second terminal of the switch $S_2$ is coupled to a control terminal of a transistor $Q_{15}$. A control terminal of the switch $S_2$ is coupled to the signal VDCT.

A supply voltage is coupled to a current mirror composed of transistors $Q_{16}$ and $Q_{17}$. A first side output of the current mirror is coupled to an input terminal of the transistor $Q_{15}$, to an input terminal of a transistor $Q_{18}$ and to input terminal of a transistor $Q_{19}$. An output terminal of the current source 147 is coupled to a control terminal of the transistor $Q_{18}$ and to an input terminal of a transistor $Q_{20}$. An output terminal of the transistor $Q_{18}$ is coupled to the control terminal of the transistor $Q_{15}$. An output terminal of the transistor $Q_{15}$ is coupled to an output terminal of the transistor $Q_{19}$ and to the signal RSET. The signal VILOOP is coupled to a control terminal of the transistor $Q_{19}$. A second side output of the current mirror is coupled to the RTCT pin of the integrated circuit $U_1$. The signal FEAO is coupled to a control terminal of the transistor $Q_{20}$. An output terminal of the transistor $Q_{20}$ is coupled to a ground node.

When the switch $S_2$ is open, the level of RSET changes with the respective levels of FEAO and VILOOP. Among the signals FEAO and VILOOP, whichever is of greater magnitude will tend to dominate the level of RSET. The level of RSET influences the switching frequency of the transistor switches $Q_1$, $Q_2$, $Q_3$ and $Q_4$, as described above. When the feedback signal VFB falls below the threshold, the switch $S_2$ is closed by the signal VDCT, which causes the level of RSET to be held at approximately 1.5 volts (which is one base-emitter junction voltage or approximately 0.7 volts below the level of the reference voltage of 2.2 volts at the control terminal of the transistor $Q_{14}$). As explained herein this clamping of RSET forces the switching frequency to be at or above the resonant frequency.

Referring again to FIG. 4, also shown is an auxiliary power supply 144 (also referred to as a "standby" power supply) that may be utilized to provide a power source for the amplifier 139, as well as possibly other elements of the system. The standby power supply 144 may be configured to obtain its power from the output, $V_{DC}$, of the PFC stage 102. The standby power supply 144 generates an auxiliary voltage supply $V_{AUX}$.

As shown in FIG. 4, the 380 VDC output of the PFC stage 102 is coupled a first terminal of a resistor $R_9$, to a first terminal of a capacitor $C_{11}$ and to a first terminal of an input winding of a transformer $T_3$. A second terminal of the resistor $R_9$ and a second terminal of the capacitor $C_{11}$ are coupled to a cathode of a diode $D_1$. A second terminal of the input winding of the transformer $T_3$ is coupled to an anode of the diode $D_1$ and to a first terminal of a switch $S_1$. A second terminal of the switch $S_1$ is coupled to a ground node. A first terminal of an output winding of the transformer $T_3$ is coupled to an anode of a diode $D_2$ and to a first terminal of a capacitor $C_{12}$. A second terminal of the secondary winding of the transformer $T_3$ is coupled to a second terminal of the capacitor $C_{12}$. A control terminal of the switch $S_1$ may be coupled to be controlled by a controller of the PFC stage 102. The standby voltage $V_{AUX}$ is formed across the capacitor $C_{12}$.

The voltage $V_{AUX}$ can be used to provide power to the amplifier 139 and to other components as described herein. The voltage $V_{AUX}$ will generally not be affected by abnormal loading, such as when a load presents abnormally low impedance, which can cause the level of the output $V_O$ of the DC-to-DC converter to fall below its regulated level of approximately 12.0 volts DC.

Figure 8:
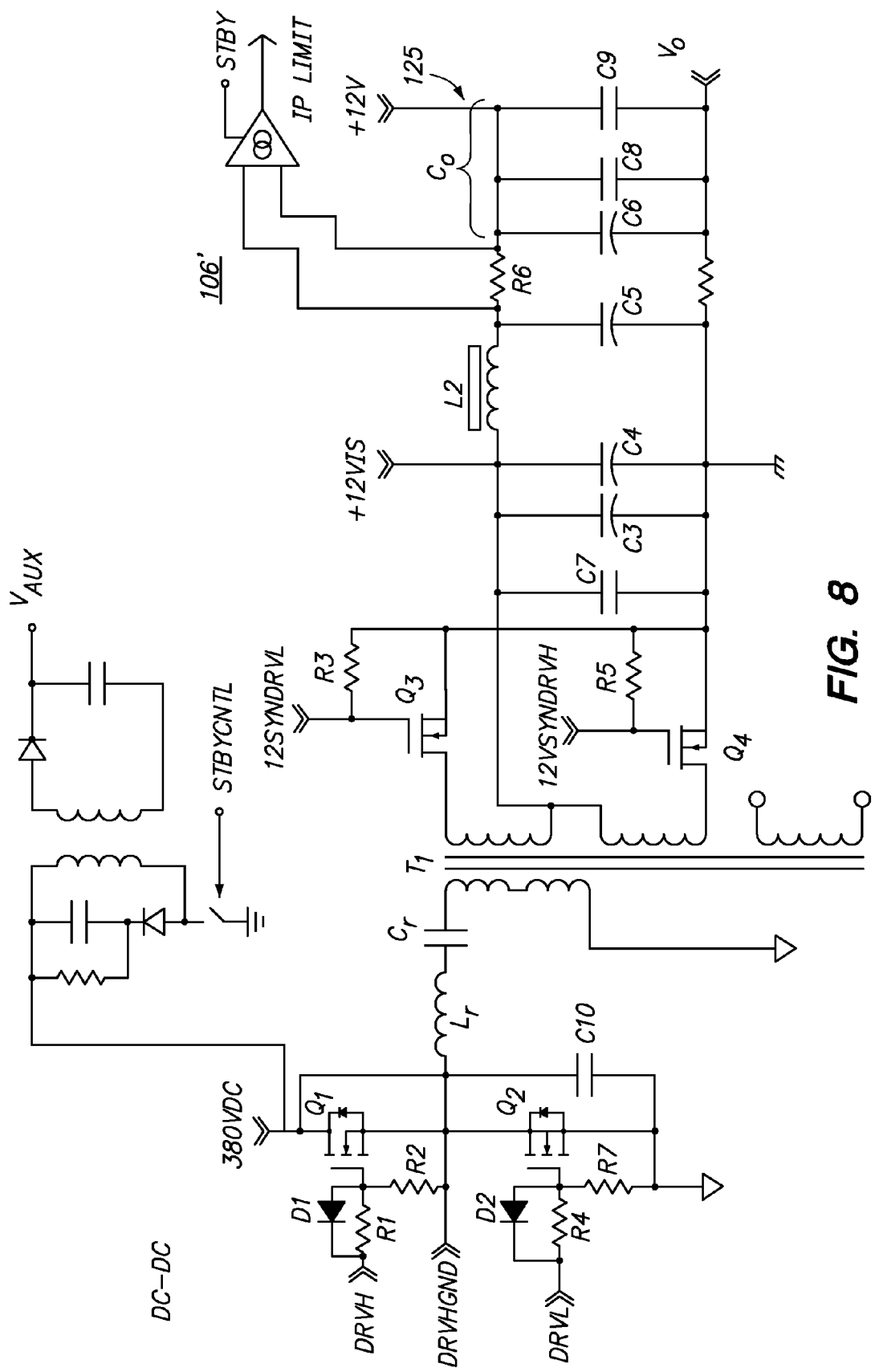
FIG. 8 illustrates a schematic diagram of a resonant switching converter in accordance with an alternative embodiment of the present invention.

As described above and shown in connection with FIG. 4, the sensing resistor R6 is coupled between the load and a ground node so that it receives a return current from the load. However, in an alternative embodiment, the sensing resistor R6 may be between the DC output and the load such that the output current passes through the sensing resistor R6 prior to reaching the load. FIG. 8 illustrates such an alternative embodiment. As shown in FIG. 8, the sensing resistor R6 is present on the DC output positive voltage side of the DC-to-DC converter and the inputs of an amplifier 139 are coupled across the current sensing resistor R6. The output current sensing and limiting functionality is as explained above in connection with FIGS. 4, 5, 6 and 7.

The amplifier 139 can be incorporated into the integrated circuit $U_1$. Alternatively, the amplifier can be a stand-alone part or can be incorporated into an integrated circuit other than the integrated circuit $U_1$.

Upon start-up, the output current may initially reach a level that is higher than normal. Therefore, to avoid triggering the current limit during start-up, the current limit level may be initially set to a higher level and then lowered after start-up. For example, when the voltage on the soft-start capacitor $C_{18}$ is below a specified level, e.g. 5.0 volts, the current limit (voltage) level may be set to 1.65 volts. Then, when the voltage on the capacitor $C_{18}$ rises above the specified level, e.g. 5.0 volts, the current limit (voltage) level may be set to 1.0 volt. Increasing the current limit level during start-up tends to result in more predictable behavior upon start-up. This feature may be implemented, for example, by a first comparator that compares the level of the voltage on the capacitor $C_{18}$ to a reference voltage at the specified level (e.g., 5.0 volts) and whose output is used to adjust a reference voltage generator whose output is 1.0 volts when the voltage on the capacitor $C_{18}$ is below 5.0 volts and whose output is 1.65 volts when the voltage on the capacitor $C_{18}$ rises above 5.0 volts. The output of this reference voltage generator may be compared by a second comparator to the signal ILIM where the output of the second comparator is connected to the amplifier 140 to disable/enable the amplifier 140.

As described above, when the current limit is triggered, operation of the switching power converter continues even though the output current is limited. In an alternative embodiment, when the current limit is triggered, switching of the power converter may be disabled. In this embodiment, however, the current limit level may be initially set to a higher level and then lowered after start-up, as is also described above. This embodiment may be implemented, for example, by connecting the output of the second comparator described above to the logic block 124 to disable/enable switching.

In accordance with an embodiment, the output FEAO of the error amplifier 114 (FIG. 6) is pulled to specified level upon start-up. The output of the amplifier 114 is then allowed to track the output voltage error. More particularly, the output of the amplifier 114 may be forced to its upper rail voltage, e.g. 6.0 volts, upon start-up. This corresponds to a maximum switching frequency and low power output using FM modulation. Then, the maximum switching frequency is reduced and power increased in the feedback loop. This embodiment has an advantage of causing the output voltage $V_O$ to increase gradually and monotonically. This feature may be implemented, for example, by a comparator that compares the level of the voltage on the capacitor $C_{18}$ to a specified level and when the level of the voltage on the capacitor $C_{18}$ is below the specified level, a switch is closed that connects the output of the error amplifier 114 to a reference voltage level. Then, when the level of the voltage on the capacitor $C_{18}$ rises above the specified level, a switch is opened to disconnect the output of the error amplifier 114 from the reference voltage level.

Figure 9:
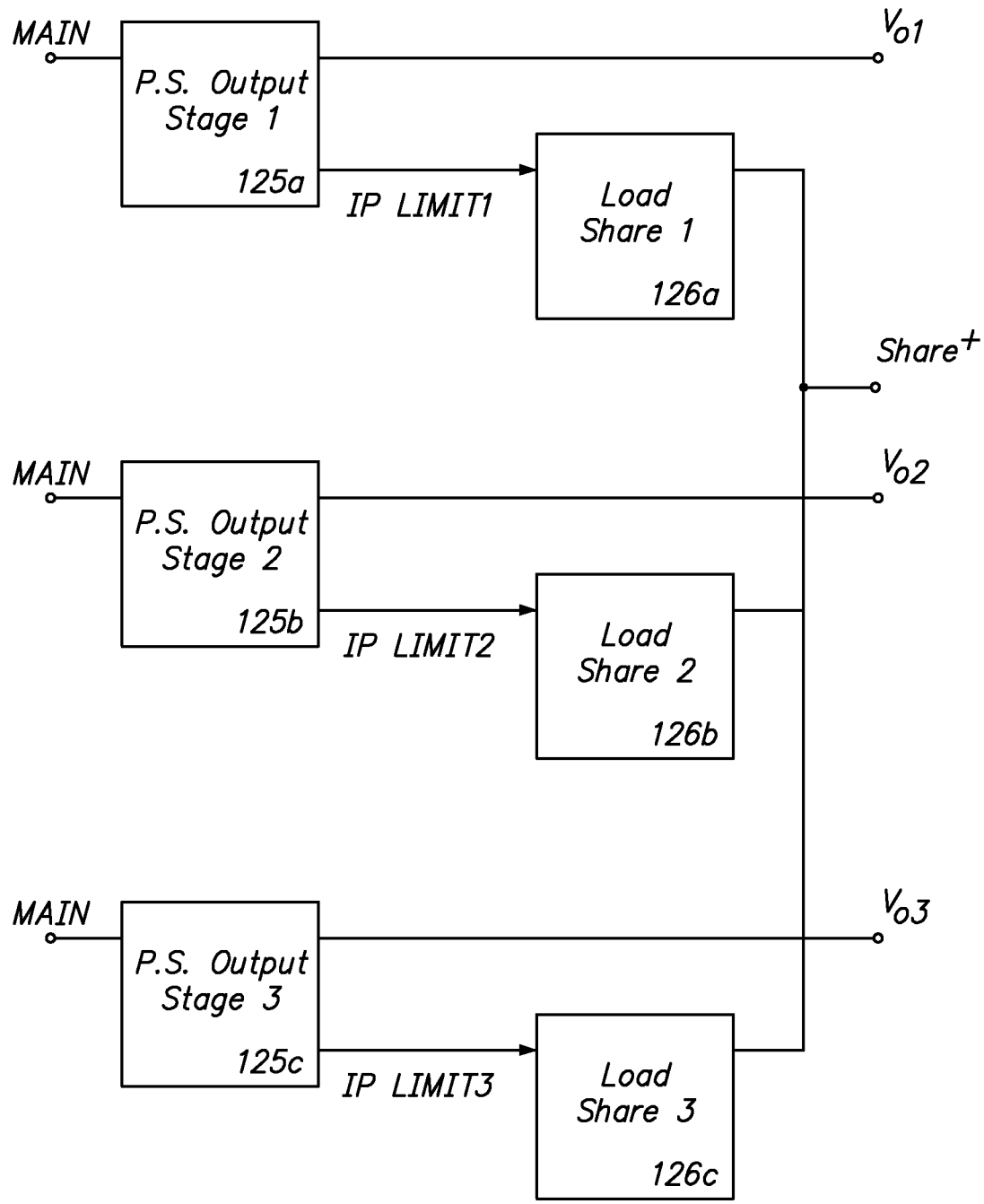
FIG. 9 illustrates a block schematic diagram of multiple output stages of a switching power supply in accordance with an embodiment of the present invention.

FIG. 9 illustrates a block schematic diagram of multiple output stages 125*a-c* of a switching power supply in accordance with an embodiment of the present invention. Each of the output stages 125*a-c* can be identical to the output stage 125 shown in FIG. 4 or 8, including the output capacitor $C_O$, the sensing resistor R6 and the amplifier 139. The output stages 125*a-c* share a common node "Main" from which current is received into the output stages 125*a-c*. Each of the output stages 125*a-c* forms a respective output voltage, labeled $V_{O1}$, $V_{O2}$ and $V_{O3}$ in FIG. 9. These output voltages $V_{O1}$, $V_{O2}$ and $V_{O3}$ can be coupled to power different loads. For example, in a computer system, the output voltage $V_{O1}$ can provide power for a central processing unit (CPU) of the computer system, the output voltage $V_{O2}$ can provide power for a memory device of the computer system, and the output voltage $V_{O3}$ can provide power for a disk drive of the computer system.

Each of the output stages 125*a-c* can generate a respective current sensing signal, labeled IP LIMIT1, IP LIMIT2 and IP LIMIT3 in FIG. 9. Each of the current sensing signals IP LIMIT1, IP LIMIT2 and IP LIMIT3 can be coupled to a respective load sharing circuit 126*a-c*. The load sharing circuits 126*a-c* have a common node labeled "Share+" in FIG. 9. The signal Share+ is representative of the highest one of the signals IP LIMIT1, IP LIMIT2 and IP LIMIT3. The signal SHARE+ can be returned to the controller of FIG. 6, replacing the signal IP ILIMIT. Accordingly, the current limiting function described herein will be activated if only one of the loads presents abnormally low impedance.

Figure 10:
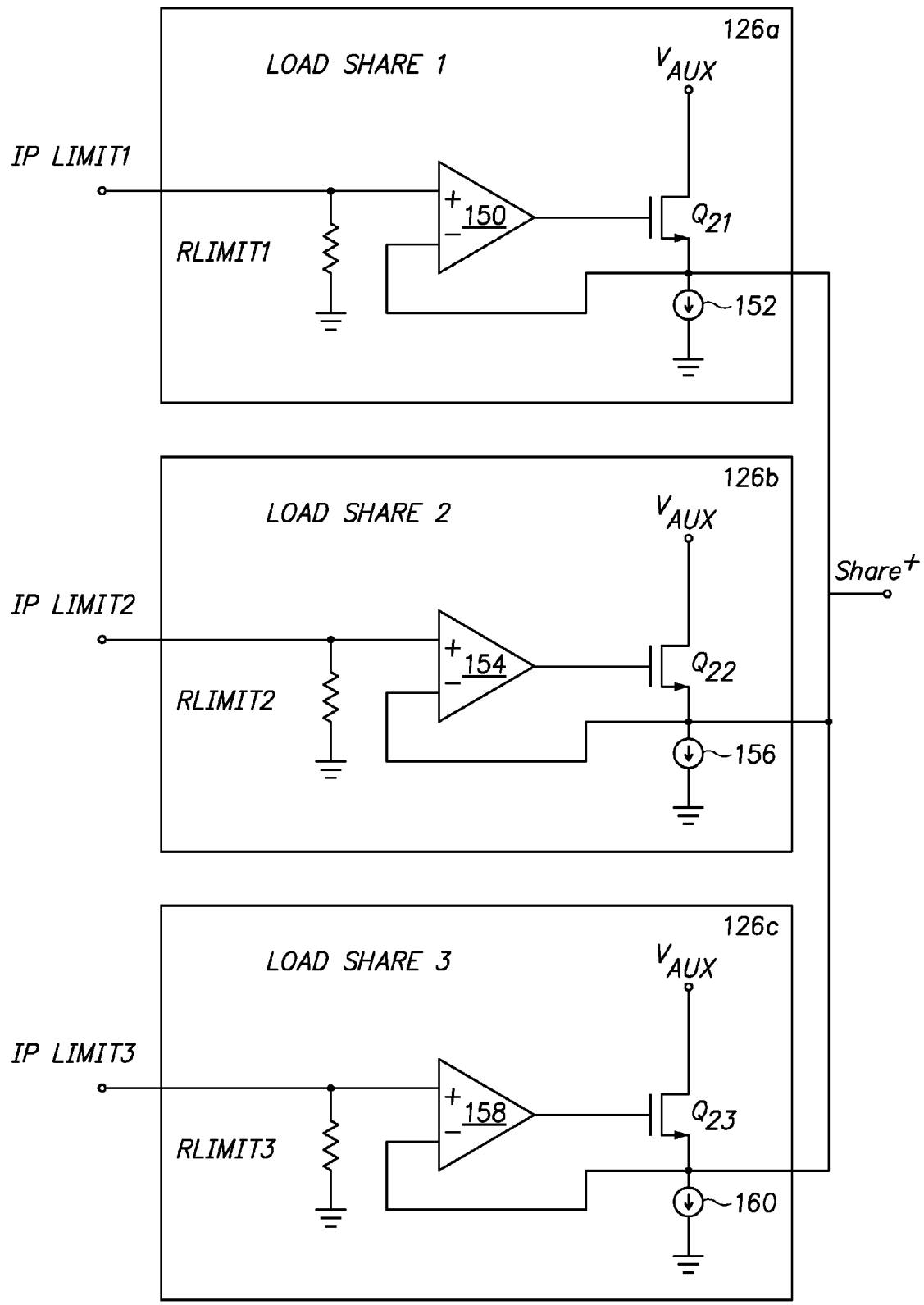
FIG. 10 illustrates a schematic diagram of a load sharing circuit arrangement for a switching power supply having multiple output stages of in accordance with an embodiment of the present invention.

FIG. 10 illustrates a schematic diagram of a load sharing circuit arrangement for a switching power supply having multiple output stages of in accordance with an embodiment of the present invention. In this embodiment, multiple loads can be powered by a power supply having multiple output stages. A signal representative of the output current delivered to each load can be generated as described above in connection with the signal IP LIMIT. In the example of FIG. 10, three such signals are generated, IP LIMIT1, IP LIMIT2 and IP LIMIT3, for each of three loads though it will be apparent that more or fewer such signals and loads can be employed, depending upon the number of loads and/or output stages of the power supply. Within a first load sharing circuit 126*a*, the signal IP LIMIT1 is coupled to a first input to amplifier 150 and to a first terminal of a resistor RLIMIT1. An output of the amplifier 150 is coupled to a control terminal of a transistor $Q_{21}$. A voltage supply Vaux is coupled to an input terminal of the transistor $Q_{21}$. An output terminal of the transistor $Q_{21}$ is coupled to a second input terminal of the amplifier 150 and to a first terminal of a current source 152. A second terminal of the resistor RLIMIT1 and an output of the current source 152 are coupled to a ground node.

Similarly, within a second load sharing circuit 126*b*, the signal IP LIMIT2 is coupled to a first input to amplifier 154 and to a first terminal of a resistor RLIMIT2. An output of the amplifier 154 is coupled to a control terminal of a transistor $Q_{22}$. A voltage supply Vaux is coupled to an input terminal of the transistor $Q_{22}$. An output terminal of the transistor $Q_{22}$ is coupled to a second input terminal of the amplifier 154 and to a first terminal of a current source 156. A second terminal of the resistor RLIMIT2 and an output of the current source 156 are coupled to a ground node.

Within a third load sharing circuit 126*c*, the signal IP LIMIT3 is coupled to a first input to amplifier 158 and to a first terminal of a resistor RLIMIT3. An output of the amplifier 158 is coupled to a control terminal of a transistor $Q_{23}$. A voltage supply Vaux is coupled to an input terminal of the transistor $Q_{23}$. An output terminal of the transistor $Q_{23}$ is coupled to a second input terminal of the amplifier 158 and to a first terminal of a current source 160. A second terminal of the resistor RLIMIT3 and an output of the current source 160 are coupled to a ground node.

The output terminals of the transistors $Q_{21}$, $Q_{22}$ and $Q_{23}$ are coupled together. The signal Share+ is formed at the output terminals of the transistors $Q_{21}$, $Q_{22}$ and $Q_{23}$. The signal Share+ is representative of the highest one of the signals IP LIMIT1, IP LIMIT2 and IP LIMIT3. The signal Share+ can replace the signal IP LIMIT for the controller 108 of FIG. 6. Accordingly, the current limiting function described herein will be activated if only one of the loads presents abnormally low impedance.

Figure 11:
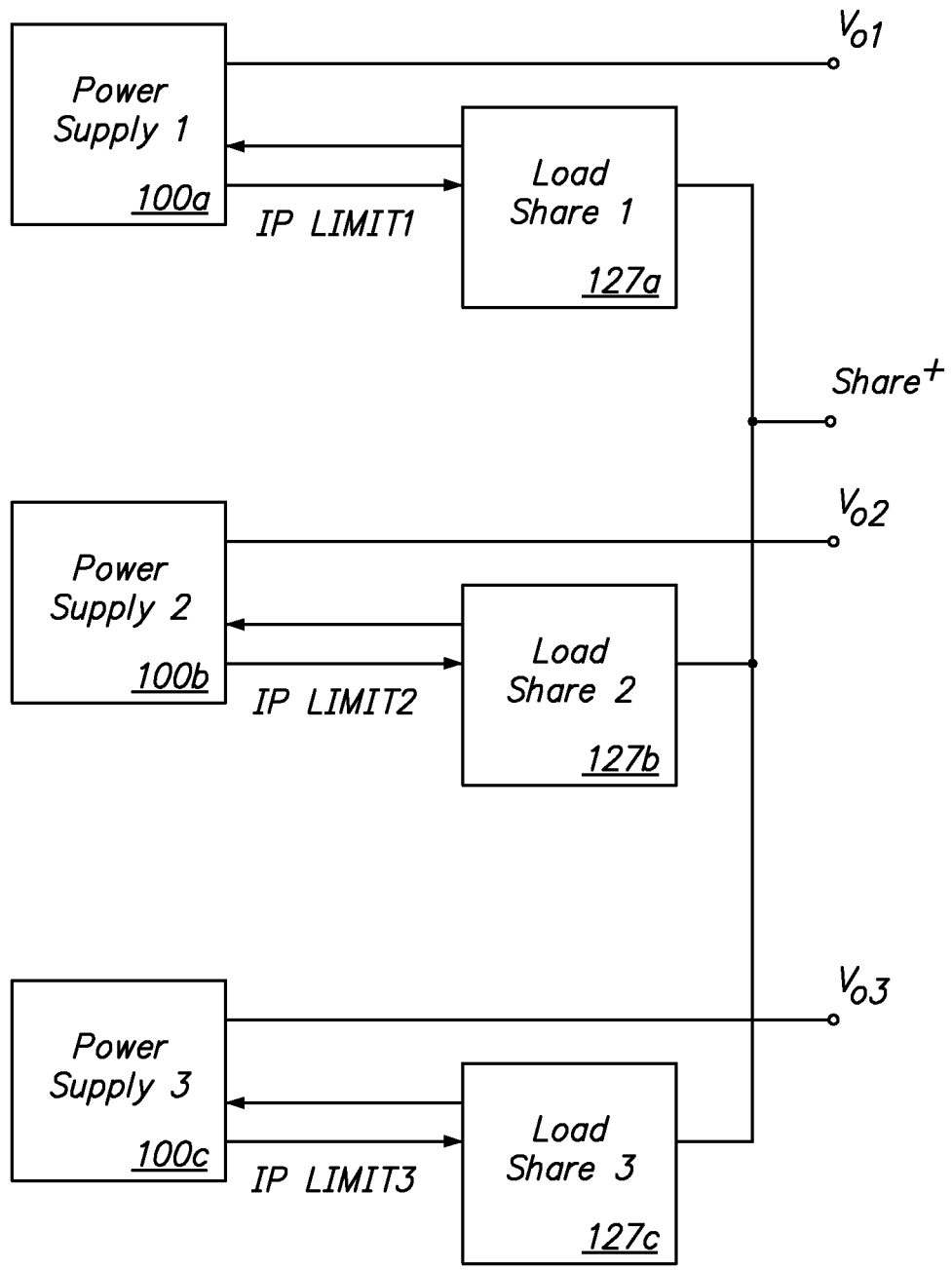
FIG. 11 illustrates a block schematic diagram of a parallel switching power supply system in accordance with an embodiment of the present invention.

FIG. 11 illustrates a block schematic diagram of a parallel switching power supply system in accordance with an embodiment of the present invention. Each of the power supplies 100*a-c* can be identical to the power supply shown in FIG. 1. Each of the power supplies 100*a-c* forms a respective output voltage, labeled $V_{O1}$, $V_{O2}$ and $V_{O3}$ in FIG. 11. These output voltages $V_{O1}$, $V_{O2}$ and $V_{O3}$ can be coupled to power to a single common load.

Each of the power supplies 100*a-c* can generate a respective current sensing signal, labeled IP LIMIT1, IP LIMIT2 and IP LIMIT3 in FIG. 11. Each of the current sensing signals IP LIMIT1, IP LIMIT2 and IP LIMIT3 can be coupled to a respective load sharing circuit 127*a-c*. The load sharing circuits 127*a-c* have a common node labeled "Share+" in FIG. 11. The signal Share+ is representative of the highest one of the signals IP LIMIT1, IP LIMIT2 and IP LIMIT3. As explained in more detail herein, the signal SHARE+ can be used by each of the load sharing circuits 127*a-c* to provide a respective feedback signal $VFB_1$, $VFB_2$, $VFB_3$, which is used to control the respective power supplies 100*a-c*. Specifically, the feedback signals can replace the signal VFB shown in FIGS. 5 and 6. Accordingly, the power supplies 100*a-c* can be controlled to provide a desired proportionate share of output current to the common load.

Figure 12:
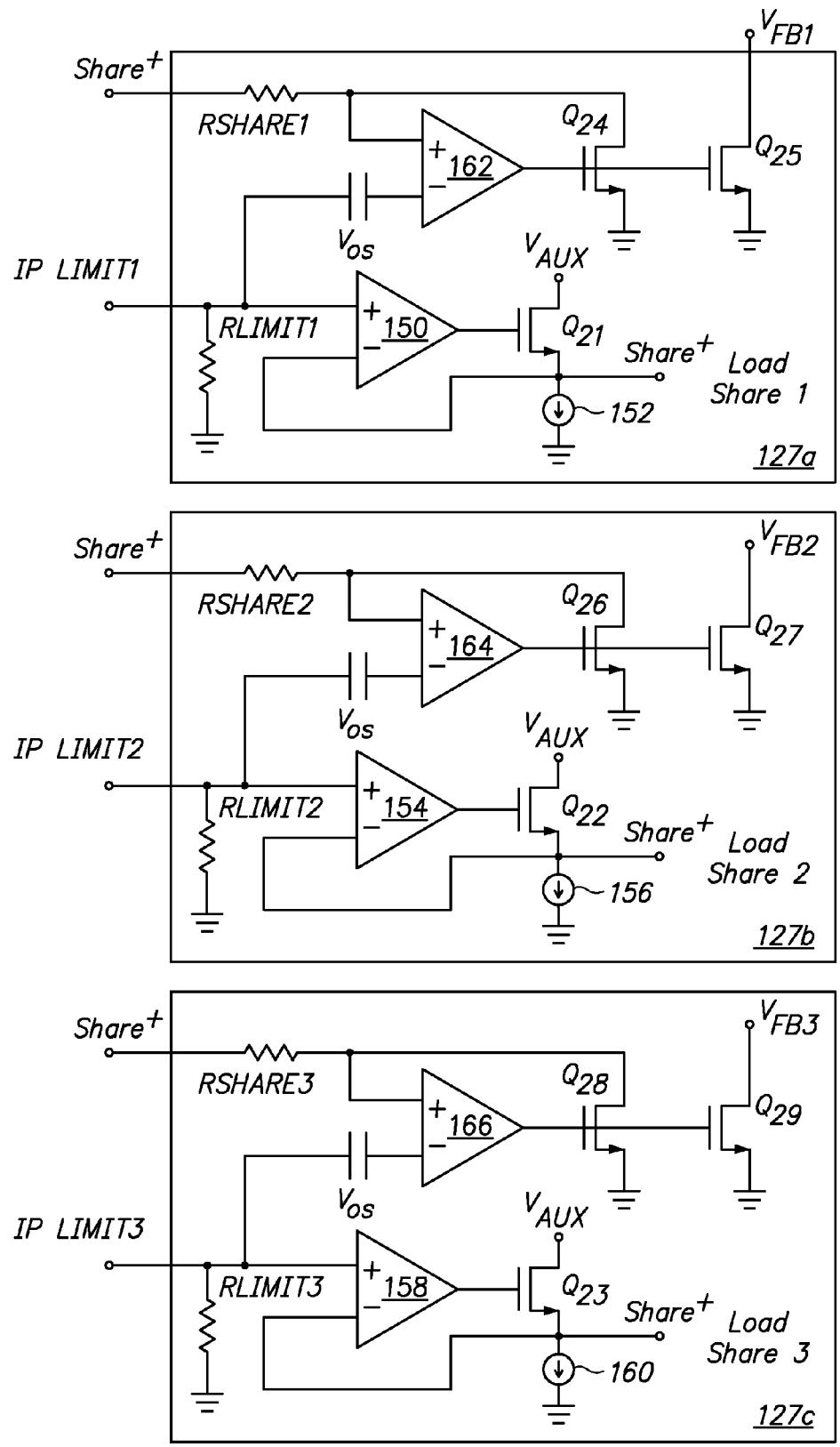
FIG. 12 illustrates a schematic diagram of a load sharing circuit arrangement for a parallel switching power supply system in accordance with an embodiment of the present invention.
Figure 12:
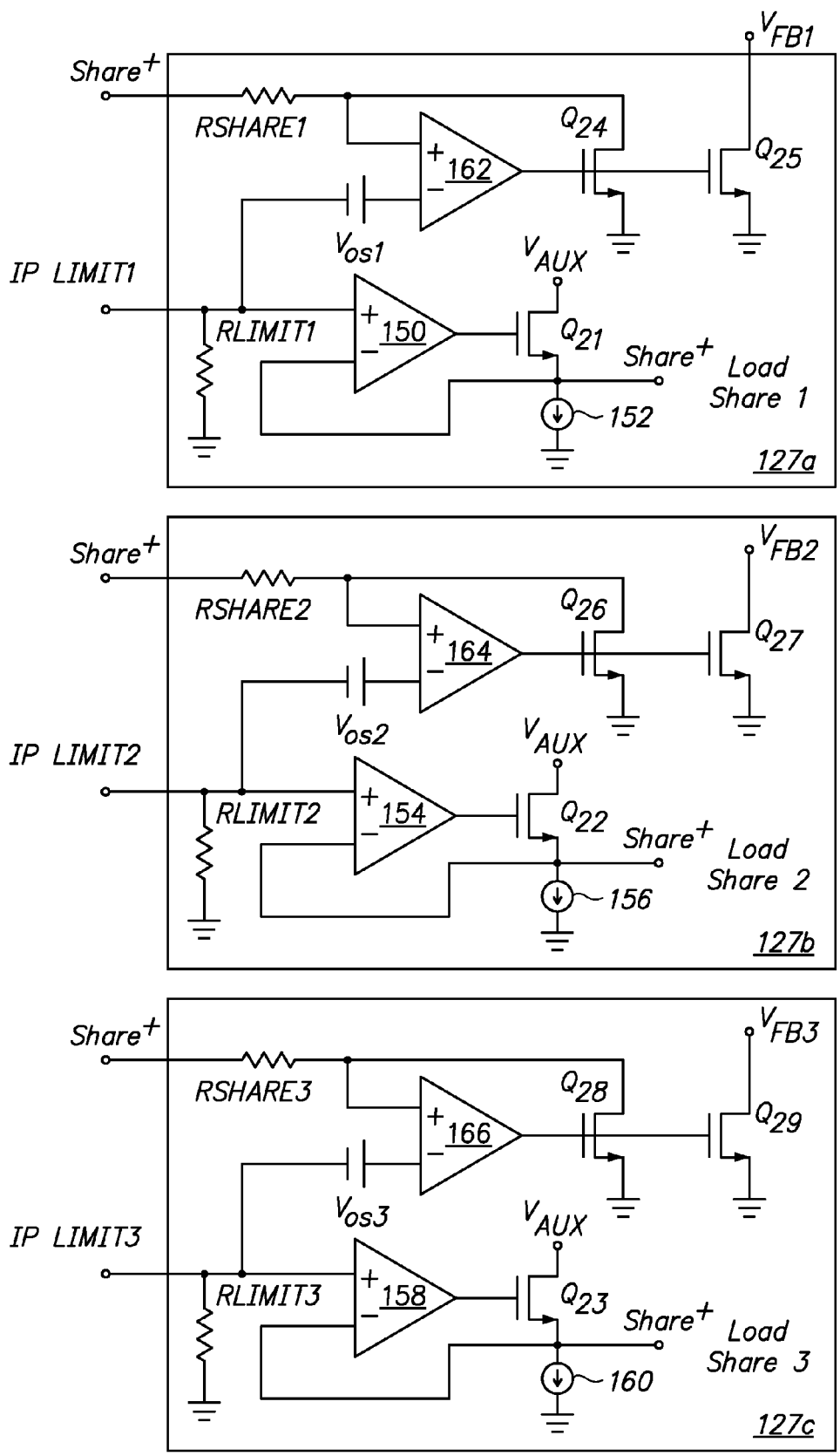

FIG. 12 illustrates a schematic diagram of a load sharing circuit arrangement for a parallel switching power supply system in accordance with an embodiment of the present invention. In this embodiment, a common load can be powered by multiple power supplies 100*a-c*. A signal representative of the output current delivered to the load by each power supply 100*a-c* can be generated as described herein in connection with the signal IP LIMIT. As shown in FIGS. 11-12, three such signals are generated, IP LIMIT1, IP LIMIT2 and IP LIMIT3, one for each of three power supplies 100*a-c*, though it will be apparent that more or fewer such signals and power supplies can be employed. Within a first load sharing circuit 127*a*, the signal IP LIMIT1 is coupled to a first input to amplifier 150 and to a first terminal of a resistor RLIMIT1. An output of the amplifier 150 is coupled to a control terminal of a transistor $Q_{21}$. A voltage supply Vaux is coupled to an input terminal of the transistor $Q_{21}$. An output terminal of the transistor $Q_{21}$ is coupled to a second input terminal of the amplifier 150, to a Share+ node and to a first terminal of a current source 152. A second terminal of the resistor RLIMIT1 and an output of the current source 152 are coupled to a ground node. In addition, the signal IP LIMIT1 is coupled to a first terminal of a voltage offset $V_{OS1}$. A second terminal of the voltage offset $V_{OS1}$ is coupled to a first terminal of an amplifier 162. An output of the amplifier 162 is coupled to a control terminal of transistors $Q_{24}$ and $Q_{25}$. The Share+ node is coupled to a first terminal of a resistor RSHARE1. A second terminal of the resistor RSHARE1 is coupled to a second input terminal of the amplifier 162 and to an input terminal of the transistor $Q_{24}$. Output terminals of the transistors $Q_{24}$ and $Q_{25}$ are coupled to a ground node. The transistors $Q_{24}$ and $Q_{25}$ form a current mirror. A feedback signal $VFB_1$ is formed at an input terminal of the transistor $Q_{25}$.

Within a second load sharing circuit 127*b*, the signal IP LIMIT2 is coupled to a first input to amplifier 154 and to a first terminal of a resistor RLIMIT2. An output of the amplifier 154 is coupled to a control terminal of a transistor $Q_{22}$. A voltage supply Vaux is coupled to an input terminal of the transistor $Q_{22}$. An output terminal of the transistor $Q_{22}$ is coupled to a second input terminal of the amplifier 154, to a Share+ node and to a first terminal of a current source 156. A second terminal of the resistor RLIMIT2 and an output of the current source 156 are coupled to a ground node. In addition, the signal IP LIMIT2 is coupled to a first terminal of a voltage offset $V_{OS2}$. A second terminal of the voltage offset $V_{OS2}$ is coupled to a first terminal of an amplifier 164. An output of the amplifier 164 is coupled to a control terminal of transistors $Q_{26}$ and $Q_{27}$. The Share+ node is coupled to a first terminal of a resistor RSHARE2. A second terminal of the resistor RSHARE2 is coupled to a second input terminal of the amplifier 164 and to an input terminal of the transistor $Q_{26}$. Output terminals of the transistors $Q_{26}$ and $Q_{27}$ are coupled to a ground node. The transistors $Q_{26}$ and $Q_{27}$ form a current mirror. A feedback signal $VFB_2$ is formed at an input terminal of the transistor $Q_{27}$.

Within a third load sharing circuit 127*c*, the signal IP LIMIT3 is coupled to a first input to amplifier 158 and to a first terminal of a resistor RLIMIT3. An output of the amplifier 158 is coupled to a control terminal of a transistor $Q_{23}$. A voltage supply Vaux is coupled to an input terminal of the transistor $Q_{23}$. An output terminal of the transistor $Q_{23}$ is coupled to a second input terminal of the amplifier 158, to a Share+ node and to a first terminal of a current source 160. A second terminal of the resistor RLIMIT3 and an output of the current source 160 are coupled to a ground node. In addition, the signal IP LIMIT3 is coupled to a first terminal of a voltage offset $V_{OS3}$. A second terminal of the voltage offset $V_{OS3}$ is coupled to a first terminal of an amplifier 166. An output of the amplifier 166 is coupled to a control terminal of transistors $Q_{28}$ and $Q_{29}$. The Share+ node is coupled to a first terminal of a resistor RSHARE3. A second terminal of the resistor RSHARE3 is coupled to a second input terminal of the amplifier 166 and to an input terminal of the transistor $Q_{28}$. Output terminals of the transistors $Q_{28}$ and $Q_{29}$ are coupled to a ground node. The transistors $Q_{28}$ and $Q_{29}$ form a current mirror. A feedback signal $VFB_3$ is formed at an input terminal of the transistor $Q_{29}$.

The circuit arrangement of FIGS. 11-12 can be used for power supply arrangements in which a common load is supplied with power generated by multiple power supplies (these multiple power supplies are each a separate power supply channel). The signals $VFB_1$, $VFB_2$, and $VFB_3$ are used to control the power output of each power supply channel and, therefore, these signals controls the proportion of the overall power supplied to the common load by each power supply channel. The power supplies can have different capacities, in which case, the gain of the amplifiers 162, 164 and 166 can be adjusted so that each power supply channel provides a desired portion of the overall power supplied to the common load. Each power supply 100*a-c* in such an arrangement can operate as described herein, including having its output current limited by feedback based on the signals IP LIMIT1, IP LIMIT2 and IP LIMIT3.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
one or more power supply stages configured to receive power from an input power source and to generate an output voltage for powering a load by alternately opening and closing a set of switches, the one or more power supply stages comprising: a resonant tank having a resonant frequency; a switching inverter coupled to the resonant tank for charging the resonant tank with energy; and a synchronous rectifier coupled to the resonant tank and configured to draw power from the resonant tank for forming the output voltage;
an output current sensor configured to monitor a level of an output current of the switching power supply, the output current sensor comprising a sensing impedance configured to receive a current that is representative of a level of the output current; and
a controller configured to control switching of the switching inverter by controlling the opening and closing of the set of switches, wherein when the level of the output current is below a threshold, the controller controls the opening and closing of the set of switches to regulate the output voltage, and wherein in response to the level of the output current exceeding the threshold, the controller increases a frequency of opening and closing of the set of switches so as to limit the output current, and wherein the controller operates in a first mode in which the switching of the synchronous rectifier is performed above the resonant frequency of the resonant tank, the first mode employing a duty cycle for the synchronous rectifier, and wherein the controller operates in a second mode in which the switching of the synchronous rectifier is performed below the resonant frequency and the duty cycle of the synchronous rectifier in the second mode is reduced from that of the first mode, and wherein the controller operates in a third mode in which the duty cycle of the synchronous rectifier and the duty cycle of the switching inverter are reduced from that of the first mode and wherein the third mode is entered in response to the switching frequency exceeding a specified level, and wherein operation in the third mode is inhibited when the level of the output current exceeds the threshold.

2. The switching power supply according to claim 1, wherein the output current sensor further comprises: first circuitry configured to amplify a signal formed by the sensing impedance thereby forming an amplified signal; and second circuitry configured to generate a current sensing signal in response to the amplified signal exceeding a threshold.

3. The switching power supply according to claim 2, wherein the output current sensor comprises a rail-to-rail amplifier.

4. The switching power supply according to claim 1, wherein the controller controls a frequency of opening and closing of the set of switches in a feedback loop using frequency modulation.

5. The switching power supply according to claim 1, wherein when the level of the output current exceeds the threshold, a duty cycle for switching in the synchronous rectifier and a duty cycle for switching in the resonant tank is maintained at fifty percent.

6. The switching power supply according to claim 5, wherein switching of the switching inverter is performed at the same frequency as the switching of the synchronous rectifier using frequency modulation and wherein a duty cycle for the switching inverter is the same in both the first mode and the second mode.

7. The switching power supply according to claim 6, wherein the duty cycle for the switching inverter is fifty percent in both the first mode and the second mode and wherein the duty cycle for the synchronous rectifier in the first mode is fifty percent.

8. The switching power supply according to claim 1, wherein when the level of the output current exceeds the threshold, a duty cycle for switching in the synchronous rectifier and a duty cycle for switching in the resonant tank is initially at fifty percent and wherein in response to a switching frequency exceeding a frequency threshold, a duty cycle for switching in the synchronous rectifier and a duty cycle for switching in the resonant tank is controlled using pulse width modulation according to the switching frequency.

9. The switching power supply according to claim 1, wherein upon start-up of the switching power supply operation of the switching inverter is commenced immediately and operation of the switching rectifier is commenced only after a delay.

10. The switching power supply according to claim 1, further comprising a transformer having a primary winding and a secondary winding, the primary winding being coupled to the resonant tank and the secondary winding being coupled to the synchronous rectifier.

11. The switching power supply according to claim 10, wherein when the output current exceeds the output current threshold, the output current is limited to avoid saturation of the transformer.

12. The switching power supply according to claim 1, wherein the output current threshold is set to a first level upon start-up of the switching power supply and, after a delay, the threshold is set to a second level, lower than the first level.

13. The switching power supply according to claim 1, further comprising an auxiliary power supply for powering the first circuitry configured to amplify a signal formed by the sensing impedance wherein the auxiliary power supply powers the first circuitry independent of a level of the output voltage generated by the one or more power supply stages.

14. The switching power supply according to claim 1, the one or more power supply stages comprising a power supply channel and further comprising one or more additional power supply channels configured to supply power to the load and a multiple load current sensor for controlling a proportion of power supplied to the common load by each power supply channel.

15. The switching power supply according to claim 14, wherein each power supply channel provides a desired portion of the power supplied to the load.

16. The switching power supply according to claim 14, wherein each of the one or more additional power supply channels comprises an output current sensor configured to monitor a level of an output current of the channel and wherein a selected one of the levels of output current is utilized by the controller.

17. A switching power supply comprising:
one or more power supply stages configured to receive power from an input power source and to generate output voltages for powering a plurality of loads by alternately opening and closing a set of switches, each load provided with a respective output current;
a multiple output current sensor configured to monitor a level of each output current, the output current sensor forming a current sense signal representative of the highest one of the output currents; and
controller circuitry configured to control the opening and closing of the sets of switches so as to maintain each output voltage at a desired level when the level of the current sense signal is below a threshold and wherein the controller is configured to control the opening and closing of the set of switches so as to limit the output current when the level of the current sense signal exceeds the threshold.

18. The switching power supply according to claim 17, the one or more power supply stages comprise: a resonant tank having a resonant frequency; a switching inverter coupled to the resonant tank for charging the resonant tank with energy; and a synchronous rectifier coupled to the resonant tank and configured to draw power from the resonant tank.

19. The switching power supply according to clam 18, wherein the controller operates in a first mode in which the switching of the synchronous rectifier is performed above the resonant frequency of the resonant tank, the first mode employing a duty cycle for the synchronous rectifier, and wherein the controller operates in a second mode in which the switching of the synchronous rectifier is performed below the resonant frequency and the duty cycle of the synchronous rectifier in the second mode is reduced from that of the first mode, and wherein the controller operates in a third mode in which the duty cycle of the synchronous rectifier and the duty cycle of the switching inverter are reduced from that of the first mode and wherein the third mode is entered in response to the switching frequency exceeding a specified level, and wherein operation in the third mode is inhibited when the level of the highest one of the output currents exceeds the threshold.

20. The switching power supply according to claim 18, wherein the one or more power supply stages further comprise a common node from which each load is provided with its respective output current.

21. A controller for a switching power supply comprising;
means for generating switching signals for alternately opening and closing a set of switches using frequency modulation for forming an output voltage;
means for monitoring a level of an output current; and
means for controlling the switching signals so as to maintain the output voltage at a desired level when the level of the output current is below a threshold and to limit the output current when the level of the output current exceeds the threshold, wherein the means for controlling is configured to operate in a first mode in which the switching is performed above a resonant frequency of the switching power supply, the first mode employing a switching duty cycle, and wherein the means for controlling is configured to operate in a second mode in which the switching is performed below the resonant frequency and the switching duty cycle in the second mode is reduced from that of the first mode, and wherein the means for controlling is configured to operate in a third mode in which the switching duty cycle is reduced from that of the first mode and wherein the third mode is entered in response to the switching frequency exceeding a specified level and wherein operation in the third mode is inhibited when the level of the output current exceeds the threshold.

22. The controller according to claim 21, wherein in response to the level of the output current exceeding the threshold, the means for controlling increases a frequency of opening and closing of the set of switches so as to limit the output current.

23. The controller for a switching power supply according to claim 21, wherein the means for monitoring a level of an output current, comprises: means for forming a signal that is representative of a level of the output current; means for amplifying the signal representative of a level of the output current thereby forming an amplified signal; and means for generating a current sensing signal in response to the amplified signal exceeding the threshold.

* * * * *